US010082069B2

(12) United States Patent
Hosokawa

(10) Patent No.: US 10,082,069 B2
(45) Date of Patent: Sep. 25, 2018

(54) ENGINE COOLING SYSTEM AND OPERATION METHOD OF THE ENGINE COOLING SYSTEM

(71) Applicant: TOYOTA JIDOSHA KABUSHIKI KAISHA, Toyota-shi, Aichi-ken (JP)

(72) Inventor: Yohei Hosokawa, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 182 days.

(21) Appl. No.: 14/875,848

(22) Filed: Oct. 6, 2015

(65) Prior Publication Data
US 2016/0169081 A1 Jun. 16, 2016

(30) Foreign Application Priority Data
Dec. 12, 2014 (JP) .................... 2014-251429

(51) Int. Cl.
*F01P 7/16* (2006.01)
*F02B 29/04* (2006.01)
(Continued)

(52) U.S. Cl.
CPC ............ *F01P 7/16* (2013.01); *F02B 29/0443* (2013.01); *F02N 11/0814* (2013.01); *F01P 7/08* (2013.01); *F01P 7/14* (2013.01); *F01P 7/162* (2013.01); *F01P 2005/125* (2013.01); *F01P 2007/146* (2013.01); *F01P 2060/08* (2013.01); *F01P 2060/16* (2013.01); *F02M 26/28* (2016.02); *Y02T 10/146* (2013.01); *Y02T 10/16* (2013.01)

(58) Field of Classification Search
CPC ................. F01P 7/162; F01P 7/14; F01P 7/08
See application file for complete search history.

(56) References Cited

U.S. PATENT DOCUMENTS 5,896,833 A * 4/1999 Aoki .................. B60H 1/00878
123/41.14
2009/0269211 A1* 10/2009 Matsutani ............... F04B 49/02
417/44.1
(Continued)

FOREIGN PATENT DOCUMENTS

| JP | 2011-99400 | 5/2011 |
| JP | 4826502 | 11/2011 |
| JP | 2014-1654 | 1/2014 |

*Primary Examiner* — Charles Brauch
(74) *Attorney, Agent, or Firm* — Finnegan, Henderson, Farabow, Garrett & Dunner, LLP

(57) ABSTRACT

Provided is an engine cooling system including: a first coolant circulation channel passing through an engine; a second coolant circulation channel bypassing the engine; an electric water pump (EWP); a connection channel connecting the first coolant circulation channel and the second coolant circulation channel; an electromagnetic valve arranged in the connection channel to change a flow rate of a coolant passing through the engine and flowing from the first coolant circulation channel to the second coolant circulation channel; an EGR cooler, a heater core, and an exhaust heat collection device arranged in the second coolant circulation channel; and a control unit, wherein closing of the electromagnetic valve is prohibited if there is an actuation request of the EGR cooler, the heater core, and the exhaust heat collection device when there is a valve closing request of the electromagnetic valve.

11 Claims, 16 Drawing Sheets

(51) Int. Cl.
  *F02N 11/08*   (2006.01)
  *F01P 7/14*    (2006.01)
  *F01P 7/08*    (2006.01)
  *F02M 26/28*   (2016.01)
  *F01P 5/12*    (2006.01)

(56) References Cited

U.S. PATENT DOCUMENTS

2010/0206250 A1\* 8/2010 Baumann ............... F01P 7/161
                                                    123/41.09
2010/0269800 A1\* 10/2010 Greszler ............... F01P 7/165
                                                    123/568.12

\* cited by examiner

ENGINE COOLING SYSTEM AND OPERATION METHOD OF THE ENGINE COOLING SYSTEM

PRIORITY INFORMATION

This application claims priority to Japanese Patent Application No. 2014-251429 filed on Dec. 12, 2014, which is incorporated herein by reference in its entirety.

TECHNICAL FIELD

The present invention relates to a structure of an engine cooling system and an operation method of the engine cooling system.

BACKGROUND ART

To efficiently operate an engine, the engine needs to be warmed up to an appropriate operation temperature after the start of the engine. Conventionally, a method of stopping circulation of a coolant for cooling the engine to raise the temperature of the engine is used as a warm-up method of the engine. Meanwhile, a method of exchanging heat between the exhaust gas of the engine and the coolant and utilizing the exhaust heat of the engine to warm the coolant to quickly warm up the engine is also used (for example, see Japanese Patent No. 4826502).

An engine cooling system is also proposed, in which a spring relief valve is provided in a connection channel that connects an engine downstream of a first coolant channel passing through an engine and a second coolant channel bypassing the engine and circulating through an exhaust heat collection device and a heater core, a flow rate of a coolant pump is reduced by closing the relief valve to stop distributing the coolant to the engine to warm up the engine, and the flow rate of the coolant pump is increased by opening the relief valve when the temperature of the coolant in the engine may boil during the warm-up or when heating of the vehicle interior is in high demand, so that the coolant passes through the engine from the first coolant channel and flows into the heater core of the second coolant channel, thereby preventing overheating of the coolant in the engine and performing control to satisfy a heating request in the vehicle interior (for example, see Japanese Patent Laid-open Publication No. 2011-99400).

Furthermore, Japanese Patent Laid-Open Publication No. 2014-1654 proposes applying an electromagnetic valve, in which the opening is reduced by applying a voltage, and the opening is increased by cutting off the voltage, in place of the spring relief valve used in the engine cooling system described in Japanese Patent Laid-Open Publication No. 2011-99400. In this system, the valve is opened according to an open request of the electromagnetic valve based on the temperature or the like of the engine regardless of the flow rate of the coolant pump. The coolant passes through the engine from the first coolant channel and flows into the heater core of the second coolant channel. In this way, overheating of the coolant in the engine can be prevented, and control can be performed to satisfy a heating request in the vehicle interior.

When the engine cooling system described in Japanese Patent Laid-Open Publication No. 2014-1654 is used, the fuel efficiency may be improved by closing the electromagnetic valve provided in the connection channel after opening the electromagnetic valve, depending on the operation status of the engine. For example, when the coolant temperature drops to some extent after intermittent stopping of the engine, the fuel efficiency can be improved by closing the opened electromagnetic valve to stop distributing the coolant into the engine to prevent the temperature of the engine from dropping too much. When high load operation is performed just after the start of the engine in a low-temperature state, the electromagnetic valve is opened even before the engine warm-up in order to prevent a local rise in the coolant temperature in the engine. Subsequently, when the load of the operation becomes low before the end of the warm-up of the engine, the engine can be more quickly warmed up by closing the opened electromagnetic valve, and the fuel efficiency can be improved. In this way, there may be a request for closing the opened electromagnetic valve depending on the operation status of the engine in order to improve the fuel efficiency in the engine cooling system described in Japanese Patent Laid-open Publication No. 2014-1654.

However, in the electromagnetic valve described in Japanese Patent Laid-open Publication No. 2014-1654, the coolant flows in a direction such that a valve body separates from a valve seat. Therefore, the valve cannot be closed by applying a voltage to the electromagnetic coil when the coolant is flowing. To close the valve, the coolant pump needs to be temporarily terminated to stop the flow of the coolant, and the voltage needs to be applied to the electromagnetic coil after the valve body is seated on the valve seat. Therefore, when the electromagnetic valve is closed after the intermittent stop of the engine for example, the coolant pump is temporarily stopped to close the electromagnetic valve in the system described in Japanese Patent Laid-Open Publication No. 2014-1654. The function of a heater core installed in a coolant circulation circuit is degraded, and the temperature of the air blown out from a blower of a heating apparatus in the vehicle temporarily drops. This may give the driver a feeling of discomfort. Furthermore, when the electromagnetic valve is closed based on a valve closing request of the electromagnetic valve for restarting the engine warm-up after the load changes from high to low just after the cold start, for example, the coolant pump is stopped, due to closing of the electromagnetic valve, and the coolant in the exhaust heat collection device may boil.

It is an advantage of the present invention to prevent giving a driver a feeling of discomfort and to prevent boiling of a coolant in an exhaust heat collection device in an engine cooling system.

SUMMARY

The present invention provides an engine cooling system including: a first coolant circulation channel passing through an engine; a second coolant circulation channel bypassing the engine; a coolant pump that circulates a coolant in the first and second coolant circulation channels; a connection channel connecting an engine outlet of the first coolant circulation channel and the second coolant circulation channel; an electromagnetic valve arranged in the connection channel to change a flow rate of the coolant passing through the engine and flowing from the first coolant circulation channel to the second coolant circulation channel; a heat exchanger arranged in the second coolant circulation channel; and a control unit that starts and stops the coolant pump and that opens and closes the electromagnetic valve, wherein the control unit prohibits closing of the electromagnetic valve if there is an actuation request of the heat exchanger when there is a valve closing request of the electromagnetic valve.

Preferably, in the engine cooling system of the present invention, the control, unit prohibits closing of the electromagnetic valve if a temperature or a temperature change of a fluid for heat exchange with the coolant by the heat exchanger when the cooling pump is stopped is expected to be equal to or greater than a predetermined first threshold, or if a coolant temperature in the heat exchanger is expected to be equal to or higher than a predetermined second threshold, when there is a valve closing request of the electromagnetic valve.

Preferably, in the engine cooling system of the present invention, the control unit closes the electromagnetic valve after stopping the coolant pump if the temperature or the temperature change of the fluid for heat exchange with the coolant by the heat exchanger when the cooling pump is stopped is expected to be smaller than the predetermined first threshold, or if the coolant temperature in the heat exchanger is expected to be lower than the predetermined second threshold, when there is a valve closing request of the electromagnetic valve.

Preferably, in the engine cooling system of the present invention, the control unit closes the electromagnetic valve after stopping the coolant pump if there is no actuation request of the heat exchanger when there is a valve closing request of the electromagnetic valve.

Preferably, in the engine cooling system of the present invention, the electromagnetic valve is a valve that holds a valve closed state when a voltage is applied while the coolant pump is stopped and that opens when the voltage is cut off during drive of the coolant pump.

Preferably, in the engine cooling system of the present invention, the electromagnetic valve includes: a casing provided with a valve seat on which a valve body is seated; an electromagnetic coil attached in the casing closer to a coolant inlet of the valve seat; and a spring for pressing the valve body toward the valve seat, pressing force of the spring being smaller than force that is generated by the drive of the pump and that is applied to the valve body in a direction from the coolant inlet to a coolant outlet, the valve body being sucked toward the coolant inlet and seated on the valve seat to maintain the valve closed state if the voltage is applied to the electromagnetic coil when the coolant pump is stopped, and the valve body being separated from the valve seat to open the valve due to coolant pressure from the coolant inlet if the voltage of the electromagnetic coil is cut off during the drive of the coolant pump.

Preferably, in the engine cooling system of the present invention, the heat exchanger is arranged in the second coolant circulation channel, downstream of a connection point of the second coolant circulation channel and the connection channel.

The present invention provides an operation method of an engine cooling system, the engine cooling system, including: a first coolant circulation channel passing through an engine; a second coolant circulation channel bypassing the engine; a coolant pump that circulates a coolant in the first and second coolant circulation channels; a connection channel connecting an engine outlet of the first coolant circulation channel and the second coolant circulation channel; an electromagnetic valve arranged in the connection channel to change a flow rate of the coolant passing through the engine and flowing from the first coolant circulation channel to the second coolant circulation channel; and a heat exchanger arranged in the second coolant circulation channel, wherein closing of the electromagnetic valve is prohibited if there is an actuation request of the heat exchanger when there is a valve closing request of the electromagnetic valve.

Preferably, in the operation method of the engine cooling system of the present invention, closing of the electromagnetic valve is prohibited if a temperature or a temperature change of a fluid for heat exchange with the coolant by the heat exchanger when the cooling pump is stopped is expected to be equal to or greater than a predetermined first threshold, or if a coolant temperature in the heat exchanger is expected to be equal to or higher than a predetermined second threshold, when there is a valve closing request of the electromagnetic valve.

Preferably, in the operation method of the engine cooling system of the present invention, the electromagnetic valve is closed after stopping the coolant pump if the temperature or the temperature change of the fluid for heat exchange with the coolant by the heat exchanger when the cooling pump is stopped is expected to be smaller than the predetermined first threshold, or if the coolant temperature in the heat exchanger is expected to be lower than the predetermined second threshold, when there is a valve closing request of the electromagnetic valve.

Preferably, in the operation method of the engine cooling system of the present invention, the electromagnetic valve is closed after stopping the coolant pump if there is no actuation request of the heat exchanger when there is a valve closing request of the electromagnetic valve.

ADVANTAGES OF THE INVENTION

The present invention attains the advantages of preventing the driver from feeling uncomfortable and preventing boiling of the coolant in the exhaust heat collection device in the engine cooling system.

DESCRIPTION OF EMBODIMENTS

<System Configuration of Engine Cooling System>

Figure 1:
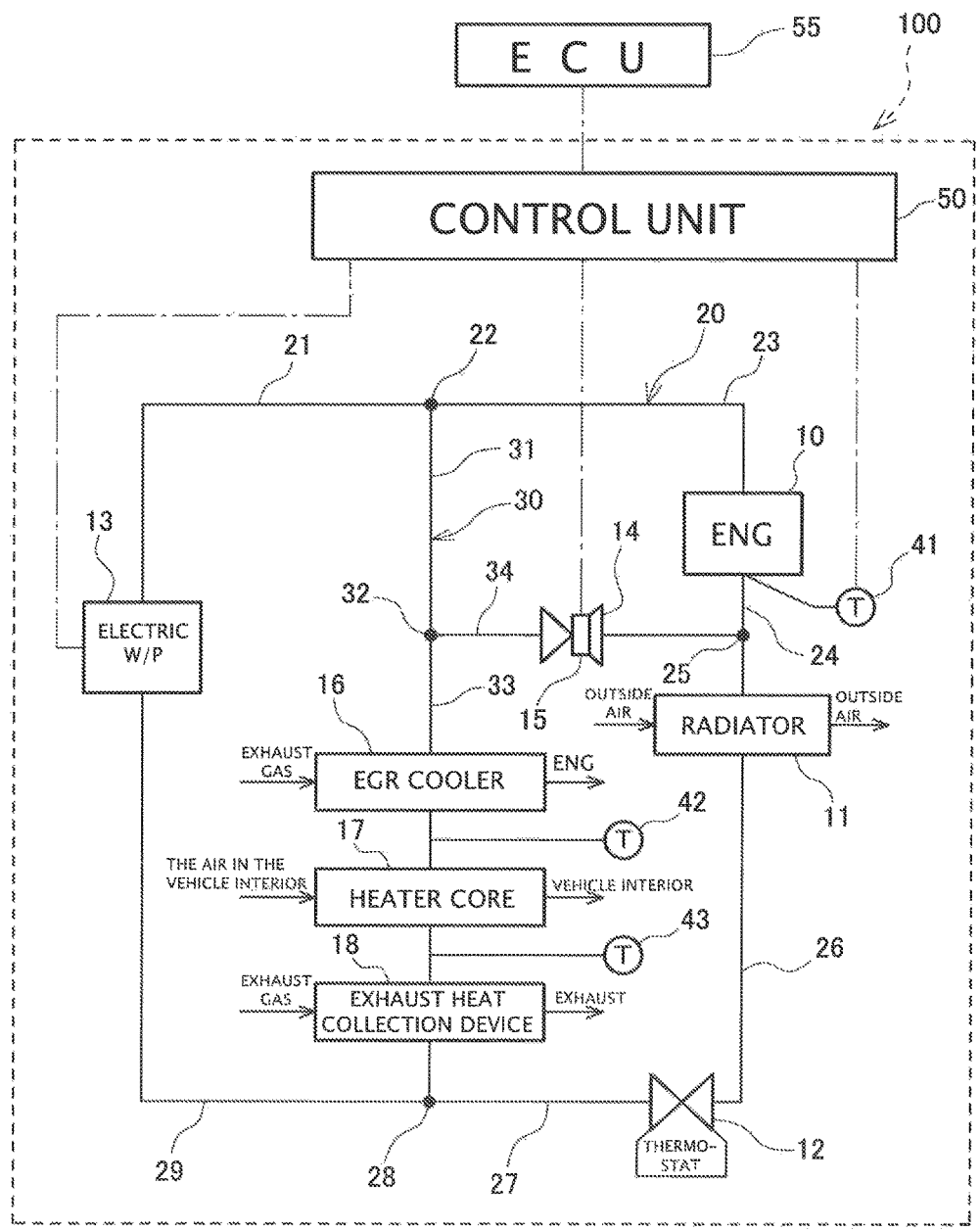
FIG. 1 is a system diagram showing a configuration of an engine cooling system, according to an embodiment of the present invention.

An engine cooling system 100 of the present embodiment will now be described with reference to the drawings. As shown in FIG. 1, the engine cooling system 100 includes: a first coolant circulation channel 20 passing through an engine 10; a second coolant circulation channel 30 bypassing the engine 10; an electric water pump (EWP) 13 that circulates a coolant in the first and second coolant circulation channels 20 and 30; a connection channel 34 connecting an outlet of the engine 10 of the first coolant circulation channel 20 and the second coolant circulation channel 30; an electromagnetic valve 14 arranged in the connection channel 34 to change a flow rate of the coolant passing through the engine 10 and flowing from, the first coolant circulation channel 20 to the second coolant circulation channel 30; an EGR cooler 16 that is a heat exchanger arranged in the second coolant circulation channel 30; a heater core 17; and an exhaust heat collection device 18. A radiator 11 and a thermostat 12 are arranged in the first coolant circulation channel 20 between, the outlet of the engine 10 and the electric water pump (EWP) 13.

As shown in FIG. 1, the first coolant circulation channel 20 includes: a pump outlet pipe 21 from the electric water pump (EWP) 13 to a branch point 22 of the first coolant circulation channel 20 and the second coolant circulation channel 30; an engine outlet pipe 24 connecting an engine inlet pipe 23 from the branch point 22 to an inlet of the engine 10, the outlet of the engine 10, and the radiator 11; a radiator outlet pipe 26 connecting the radiator 11 and the thermostat 12; a thermostat outlet pipe 27 connecting the thermostat 12 and a junction 28 with the second coolant circulation channel 30; and a pump inlet pipe 29 between the junction 28 and the electric water pump (EWP) 13. Therefore, the first coolant circulation channel 20 is a channel in which the coolant circulates through [the electric water pump (EWP) 13→the pump outlet pipe 21→the branch point 22→the engine inlet pipe 23→the engine 10→the engine outlet pipe 24→the radiator 11→the radiator outlet pipe 26→the thermostat 12→the thermostat outlet pipe 27→the junction 28→the pump inlet pipe 29→the electric water pump (EWP) 13].

The second coolant circulation channel 30 includes: an engine bypass pipe 31 from the branch point 22 of the first coolant circulation channel 20 to a junction with the connection channel 34, the engine bypass pipe 31 branching from the branch point 22 and bypassing the engine 10; and a radiator bypass pipe 33 from the junction 32 to the junction 28 with the first coolant circulation channel 20, the radiator bypass pipe 33 bypassing the radiator 11. The second coolant circulation channel 30 shares the electric water pump (EWP) 13, the pump outlet pipe 21, and the pump inlet pipe 29 with the first coolant circulation channel 20. The radiator bypass pipe 33 is provided with: the EGR cooler 16 that cools exhaust gas recirculating in the engine 10 from the upstream side; the heater core 17 for heating the air in the vehicle interior; and the exhaust heat collection device 18 that collects, in the coolant, exhaust heat of the exhaust gas of the engine 10. Therefore, the second coolant circulation channel 30 is a channel in which the coolant circulates through [the electric water pump (EWP) 13→the pump outlet pipe 21→the branch point 22→the engine bypass pipe 31→the junction 32→the radiator bypass pipe 33→the EGR cooler 16→the heater core 17→the exhaust heat collection device 18→the junction 28→the pump inlet pipe 29→the electric water pump (EWP) 13].

The connection channel 34 is a coolant channel connecting a branch point 25 of the engine outlet pipe 24 of the first coolant circulation channel 20 and the junction 32 of the second coolant circulation channel 30, and the electromagnetic valve 14 opened and closed by the electromagnetic coil 15 is attached in the middle. The electromagnetic valve 14 is a valve for opening and closing the flow of the coolant (changing the flow rate of the coolant) from the first coolant circulation channel 20 to the second coolant circulation channel 30.

A temperature sensor 41 that detects coolant temperature of the engine 10 is attached to a coolant outlet of the outlet of the engine 10. Temperature sensors 42 and 43 that detect the coolant temperature are attached between an outlet of the EGR cooler 16 and an inlet of the heater core 17 and between an outlet of the heater core 17 and an inlet of the exhaust heat collection device 18 of the radiator bypass pipe 33 of the second coolant circulation channel 30, respectively.

The control unit 50 is a computer including a CPU and a storage unit inside. The electric water pump (EWP) 13 and the electromagnetic coil 15 of the electromagnetic valve 14 are connected to the control unit 50 and driven by commands of the control unit 50. Detection signals of the temperature sensors 41 to 43 are input to the control unit 50. Signals from an ECU 55 that controls the entire vehicle provided with the engine 10 are also input to the control unit 50.

<Configuration and Action of Electromagnetic Valve>

Figure 2:
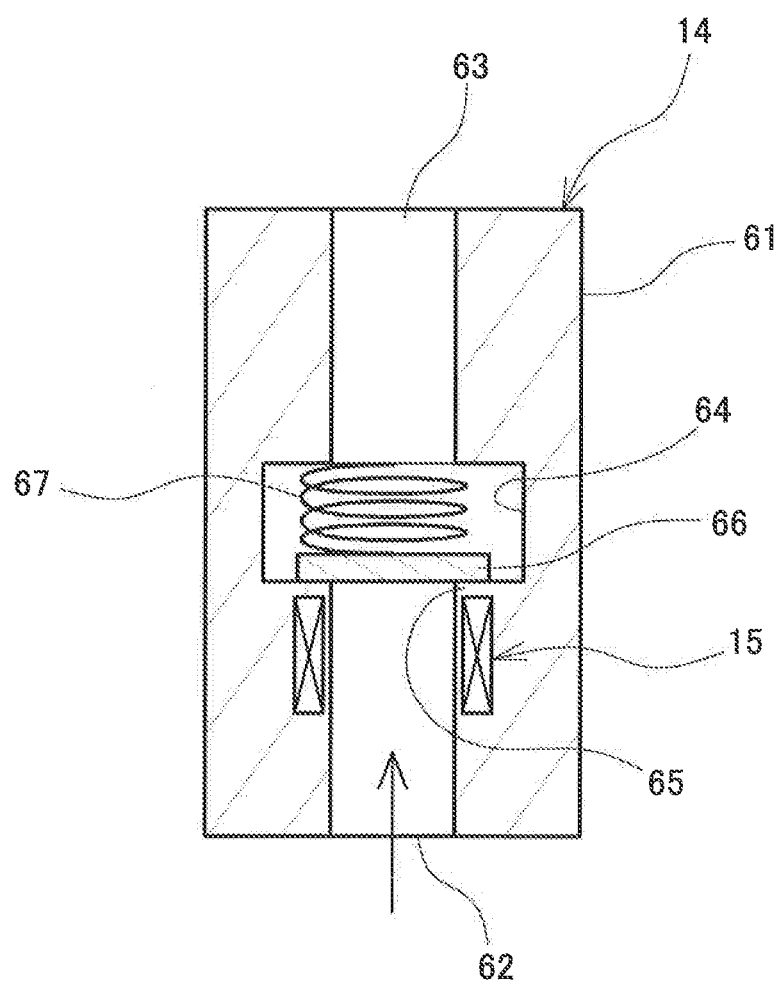
FIG. 2 is a sectional view of a valve closed state of an electromagnetic valve used in the engine cooling system according to the embodiment of the present invention.

As shown in FIG. 2, the electromagnetic valve 14 includes: a casing 61 provided with a coolant inlet 62, a coolant outlet 63, and a cavity 64 housing a valve body 66 and a coil spring 67 arranged between the coolant inlet 62 and the coolant outlet 63; a valve seat 65 formed closer to the coolant inlet 62 relative to the cavity 64; and the electromagnetic coil 15 arranged closer to the coolant inlet 62 relative to the valve seat 65. The coil spring 67 presses the valve body 66 toward the valve seat 65. However, the force of the coil spring 67 pressing the valve body 66 against the valve seat 65 is smaller than the force of the coolant pressure caused by the drive of the electric water pump (EWP) 13 from the coolant inlet 62 toward the coolant outlet 63. When a voltage is applied, the electromagnetic coil 15 sucks the valve body 66 toward the coolant inlet 62. The suction power exerted on the valve body 66 of the electromagnetic coil 15 is maximum in a state where the valve body 66 is seated on the valve seat 65, and the suction power decreases with an increase in the distance from the valve body 66 to the valve seat 65.

Figure 3:
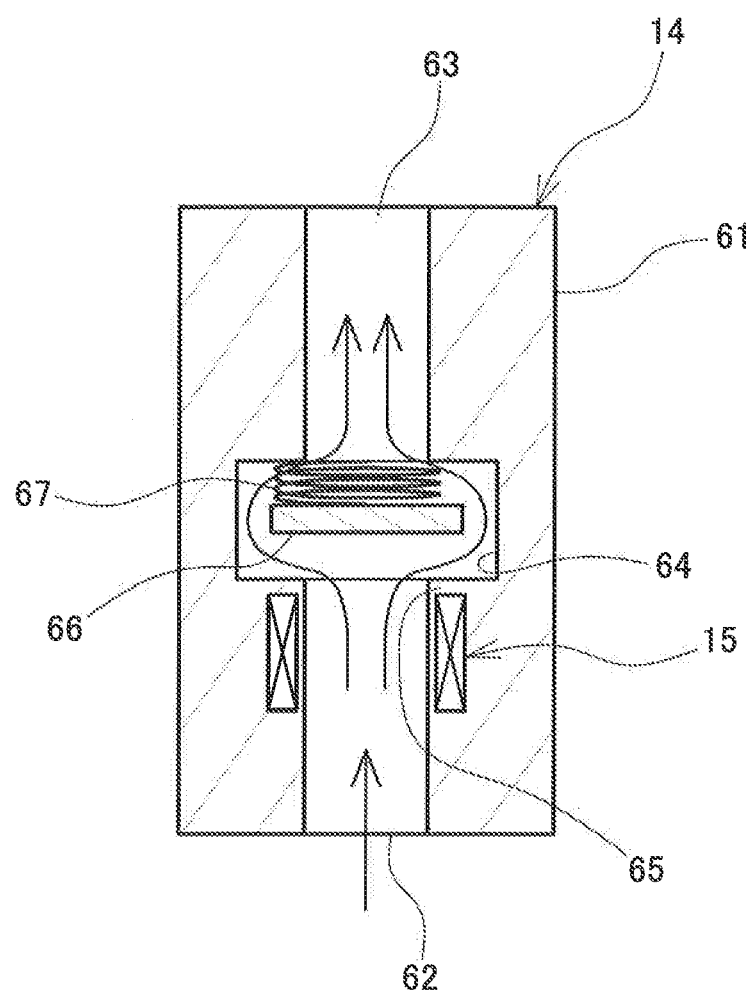
FIG. 3 is a sectional view of a valve open state of the electromagnetic valve used in the engine cooling system according to the embodiment of the present invention.

The electromagnetic valve 14 opens and closes as described below based on the drive state of the electric water pump (EWP) 13 and the voltage application state of the electromagnetic coil 15. As described, the force of the coil spring 67 pressing the valve body 66 against the valve seat 65 is smaller than the force of the coolant pressure generated by the drive of the electric water pump (EWP) 13 from the coolant inlet 62 toward the coolant outlet 63. Therefore, when the electric water pump (EWP) 13 is stopped, the valve body 66 is seated on the valve seat 65 due to the pressing force of the coil spring 67, regardless of the application of voltage to the electromagnetic coil 15. However, when the electric water pump (EWP) 13 is driven in a state where the voltage is not applied to the electromagnetic coil 15, the valve body 66 moves away from the valve seat 65 due to the pressure of the coolant, and the coolant flows from the coolant inlet 62 toward the coolant outlet 63 as shown in FIG. 3. As shown in FIG. 2, when, the voltage is applied to the electromagnetic coil 15, the valve body 66 is pressed against the valve seat 65 by the pressing force of the coil spring 67 and the suction, power of the electromagnetic coil 15. The resultant force of the pressing force and the suction power is larger than the force toward the coolant outlet 63 applied to the valve body 66 by the coolant pressure applied to the coolant inlet 62 when the electric water pump (EWP) 13 is driven. Therefore, the valve body 66 maintains the state seated on the valve seat 65, that is, the valve closed state, even if the electric water pump (EWP) 13 is driven in the state where the voltage is applied to the electromagnetic coil 15. Meanwhile, the power of the electromagnetic coil 15 sucking the valve body 66 becomes weaker with an increase in the distance from the valve body 66 to the valve seat 65 as shown in FIG. 3, due to the pressure of the coolant. As shown in FIG. 3, when the valve body 66 moves to the upper part of the cavity 64 due to the pressure of the coolant, the suction power of the electromagnetic coil 15 becomes smaller than the force applied to the valve body 66 by the pressure of the coolant. Therefore, once the valve body 66 moves to the upper part of the cavity 64 after opening the electromagnetic valve 14, the valve body 66 cannot be sucked to put the valve body 66 on the valve seat 65 even if a voltage is applied to the electromagnetic coil 15. In this case, when the drive of the electric water pump (EWP) 13 is stopped to eliminate the coolant pressure, the valve body 66 moves toward the valve seat 65 due to the force of the coil spring 67, and then the valve body 66 is seated on the valve seat 65 by the suction power of the electromagnetic coil 15. As described, the valve body 66 can maintain the state seated on the valve seat 65 even if the electric water pump (EWP) 13 is driven in the state where the valve body 66 is seated on the valve seat 65. Therefore, the electromagnetic valve 14 can be closed by applying a voltage to the electromagnetic valve 14 after stopping the electric water pump (EWP) 13 in the state where the electromagnetic valve 14 is open. More specifically, the electromagnetic valve 14 is a valve that is closed and opened by applying and cutting off the voltage from the electromagnetic coil 15. The electromagnetic valve 14 is opened by the rise in the coolant pressure when the electric water pump (EWP) 13 is driven while the voltage is cut off, and the electromagnetic valve 14 is closed when the voltage is applied to the electromagnetic coil 15 after stopping the electric water pump (EWP) 13. It can also be stated that the electromagnetic valve 14 is a valve that holds the valve closed state if the voltage is applied when the electric water pump (EWP) 13 is stopped and that is opened if the voltage is cut off when the electric water pump (EWP) 13 is driven. In the electromagnetic valve 14, the valve body 66 is pressed against, the valve seat 65 by the fluid pressure when the pressure near the coolant outlet 63 is higher than the pressure near the coolant inlet 62 as shown in FIG. 2, and the coolant does not flow from the coolant outlet 63 toward the coolant inlet 62. Therefore, the electromagnetic valve 14 is an electromagnetic check valve or a check valve with electromagnetic valve closing and holding function.

<Action of Engine Cooling System and Flow of Coolant in Engine Cold Start>

Action and a flow of the coolant in engine cold start of the engine cooling system 100 with the system configuration and the electromagnetic valve 14 described above will be described. In an initial state, the EWP 13 is stopped, and the engine 10 is stopped. The electromagnetic valve 14 is closed, and the flow of the coolant is stopped. The temperature of the engine 10 is low, and the thermostat 12 is also in the closed state.

Figure 4:
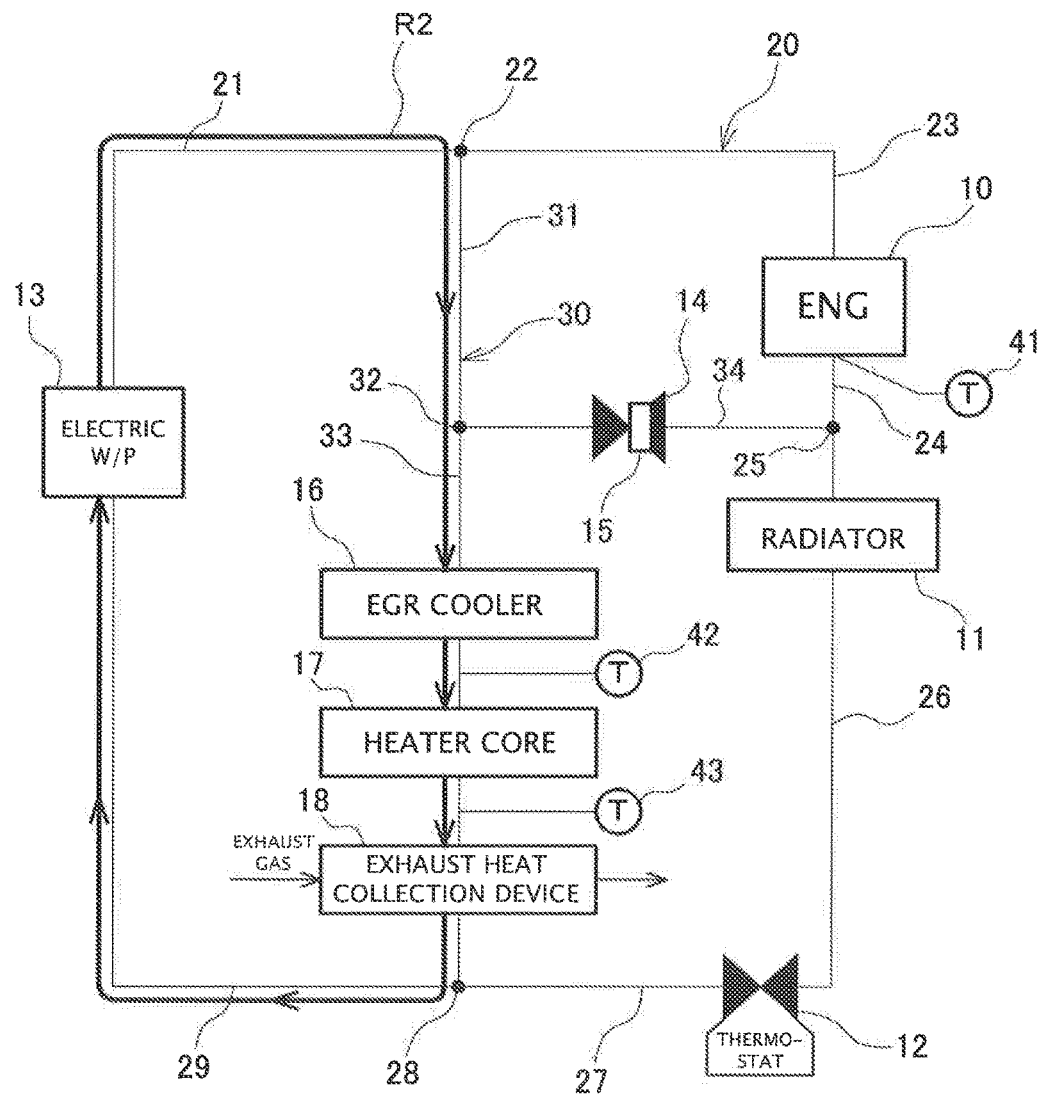
FIG. 4 is an explanatory view showing a flow of a coolant in the engine cooling system according to the embodiment of the present invention just after engine cold start.

When a signal indicating the start of the engine 10 is input from the ECU 55 to the control unit 50, the control unit 50 outputs a command for applying a voltage to the electromagnetic coil 15 of the electromagnetic valve 14. The voltage is applied to the electromagnetic coil 15 of the electromagnetic valve 14 as a result of the command, and as shown in FIG. 2, the electromagnetic force of the electromagnetic coil 15 sucks the valve body 66 of the electromagnetic valve 14 to the valve seat 65. The control unit 50 then outputs a command for starting the EWP 13. The EWP 13 is started as a result of the command. Since the voltage is applied to the electromagnetic coil 15 of the electromagnetic valve 14 first, the valve body 66 is sucked to the valve seat 65 and maintains the seated state even when the pressure of the coolant is applied to the valve body 66 due to the drive of the EWP 13. In this state, the electromagnetic valve 14 is in the valve closed state, and the coolant discharged from, the EWP 13 circulates in the second coolant circulation channel 30 through the EWP 13 the pump outlet pipe 21→the branch point 22→the engine bypass pipe 31→the radiator bypass pipe 33→the EGR cooler 16→the heater core 17→the exhaust heat collection device 18→the junction 28→the pump inlet pipe 29→the EWP 13, as shown in FIG. 4 (reference sign R2 in FIG. 4 indicates the circulation channel of the coolant). The coolant does not flow through the engine 10, and the temperature of the coolant in the engine 10 (in a water jacket or the like) gradually rises due to the heat generated by the combustion in the engine 10. Meanwhile, the exhaust air of the engine 10 flows to the exhaust heat collection device 18, and the heat warms the coolant. In this way, when the temperature of the engine 10 and the load are low just after the start of the engine 10, the temperature of the engine 10 rises due to the combustion heat of the fuel, and the exhaust heat of the engine 10 warms the coolant circulating through the second coolant circulation channel 30.

Figure 5:
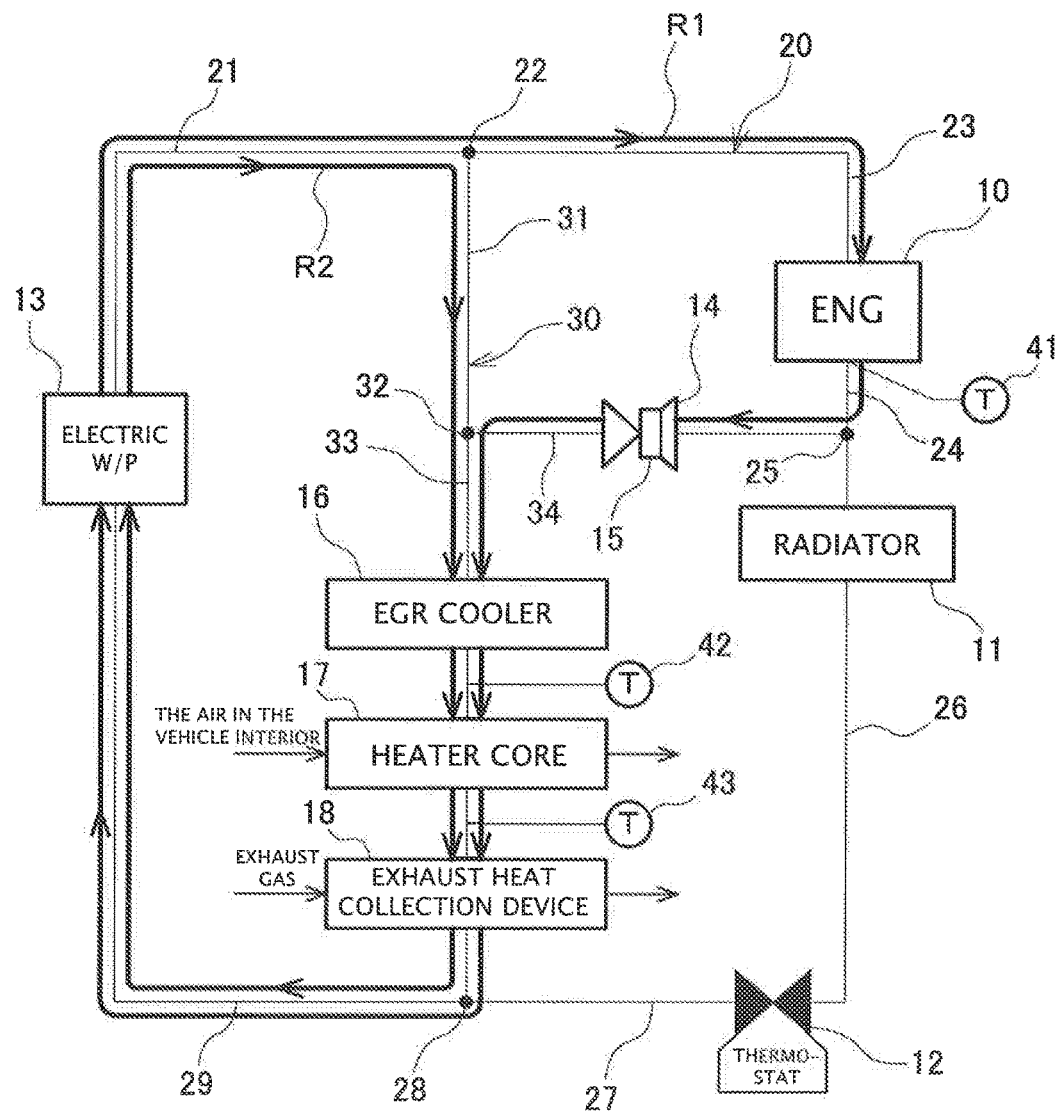
FIG. 5 is an explanatory view showing a flow of the coolant in the engine cooling system according to the embodiment of the present invention during engine warm-up.

When the coolant temperature of the engine outlet detected by the temperature sensor 41 rises to a predetermined temperature, such as about 60° C., the control unit 50 outputs a command for cutting off the application of the voltage to the electromagnetic coil 15 to open the electromagnetic valve 14 in order to distribute the coolant to the engine 10. The voltage to the electromagnetic coil 15 is cut off by the command. Since the EWP 13 is driven, the coolant pressure is applied to the coolant inlet 62 of the electromagnetic valve 14 as shown in FIG. 3, and the valve body 66 moves away from the valve seat 65 to move to the upper part of the cavity 64 due to the pressure of the coolant when the voltage to the electromagnetic coil 15 is cut off. As a result, the electromagnetic valve 14 is opened. When the electromagnetic valve 14 is opened, the coolant flows through, in addition to the circulation path indicated by reference signal R2 described above, the EWP 13→the pump outlet pipe 21→the branch point 22 of the first coolant circulation channel 20→the engine inlet pipe 23→the engine 10→the engine outlet pipe 24→the connection channel 34→the electromagnetic valve 14→the junction 32→the radiator bypass pipe 33→the EGR cooler 16→the heater core 17→the exhaust heat collection device 18→the junction 28→the pump inlet pipe 29→the EWP 13, thereby flowing from the first coolant circulation channel 20 to the second coolant circulation channel 30 through the connection channel 34 (reference numeral R1 in FIG. 5 indicates the flow of the coolant). At this point, the temperature of the engine 10 is lower than the temperature for opening the thermostat 12, and the coolant does not pass through the radiator 11 and the thermostat 12.

Figure 6:
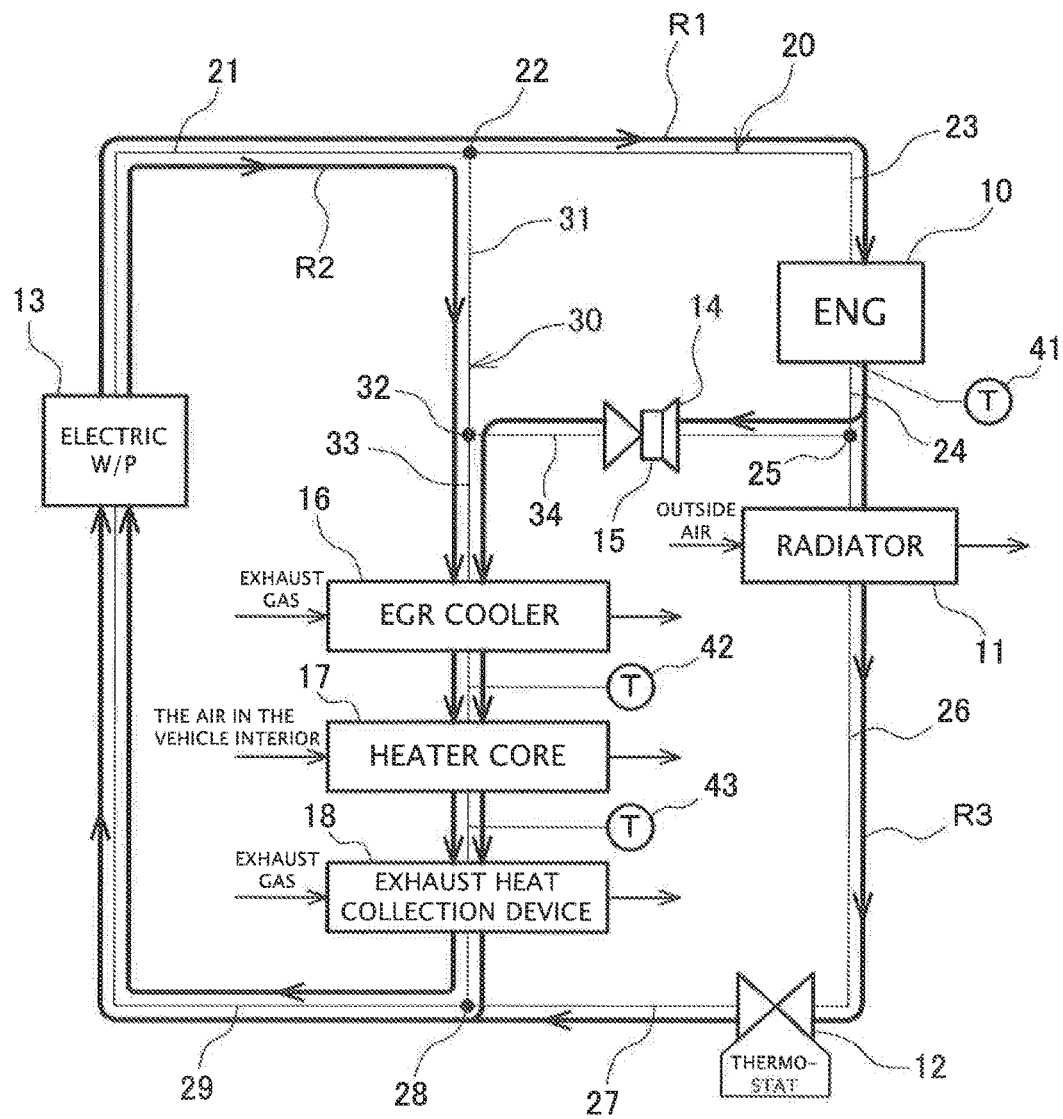
FIG. 6 is an explanatory view showing a flow of the coolant in the engine cooling system according to the embodiment of the present invention after the engine warm-up (during normal operation)

In this state, the temperature of the coolant flowing through the first and second coolant circulation channels 20 and 30 has risen to about 50 to 60° C. Therefore, when there is a heating request of the vehicle interior, the air in the vehicle interior flows into the heater core 17, and warmed air is blown out from the blower to the vehicle interior. When the engine 10 is operated for a while in this state, the temperature of the engine 10 gradually rises, and the coolant temperature also gradually rises. The thermostat 12 is opened when the temperature of the coolant at the outlet of the engine 10 rises to, for example, about 80° C., and the coolant passes through the radiator 11 from the engine outlet and flows into the EWP 13 from the junction 28. Reference sign R3 in FIG. 6 indicates the flow of the coolant. In this way, the coolant flows through the channels indicated by reference signs R1, R2, and R3 to perform normal operation, and the EGR is turned on when the load of the engine 10 rises. In this case, the exhaust gas of the engine 10 also flows to the EGR cooler 16. As in the exhaust heat collection device 18, the heat of the exhaust gas is collected in the coolant, and the coolant temperature rises. The radiator 11 cools the coolant in which the temperature has risen through the engine 10, the EGR cooler 16, or the exhaust heat collection device 18.

<Example of Action of Engine Cooling System 100 when Electromagnetic Valve is Open, there is Closing Request of Electromagnetic Valve during Drive of EWP, and there is Operation Request of Heater Core (Action in Engine Intermittent Stop)>

With reference to FIGS. 7 to 12, Operation of the engine cooling system 100 in the engine intermittent, stop will be described as an example of operation of the engine cooling system 100 when the electromagnetic valve 14 is open, there is a valve closing request of the electromagnetic valve 14 during the drive of the EWP 13, and there is an operation request of the heater core 17. The engine 10 is performing the normal operation just before the intermittent stop of the engine 10, and the voltage is not applied to the electromagnetic coil 15 of the electromagnetic valve 14. The electromagnetic valve 14 is in the valve open state, and the EWP 13 is driven. The coolant flows as indicated by reference signs R1, R2, and R3 of FIG. 6.

Figure 7:
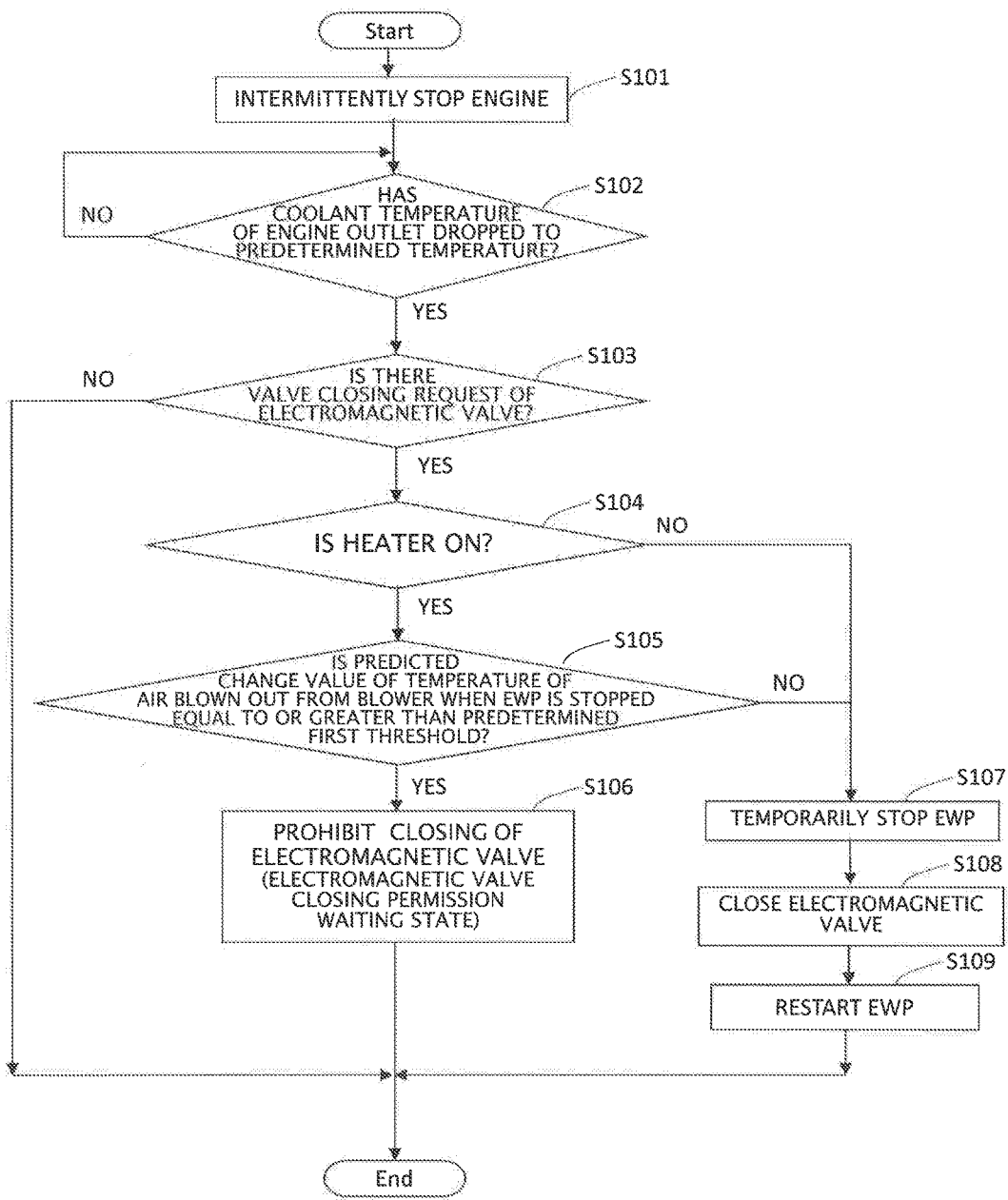
FIG. 7 is a flow chart showing opening and closing of the electromagnetic valve and action of an electric water pump (EWP) in the engine cooling system according to the embodiment of the present invention at the time of engine intermittent stop.
Figure 8:
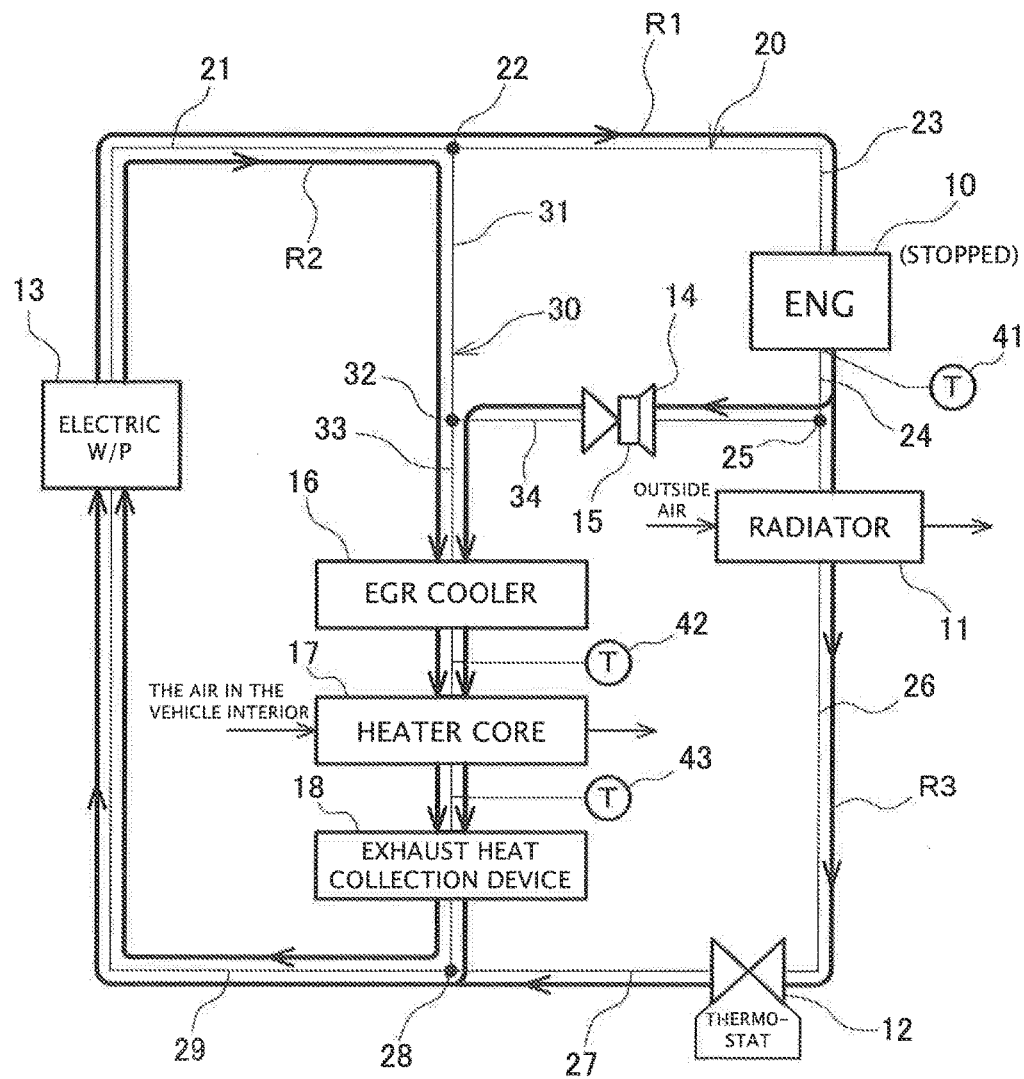
FIG. 8 is an explanatory view showing a flow of the coolant in the engine cooling system according to the embodiment of the present invention just after the engine intermittent stop.
Figure 9:
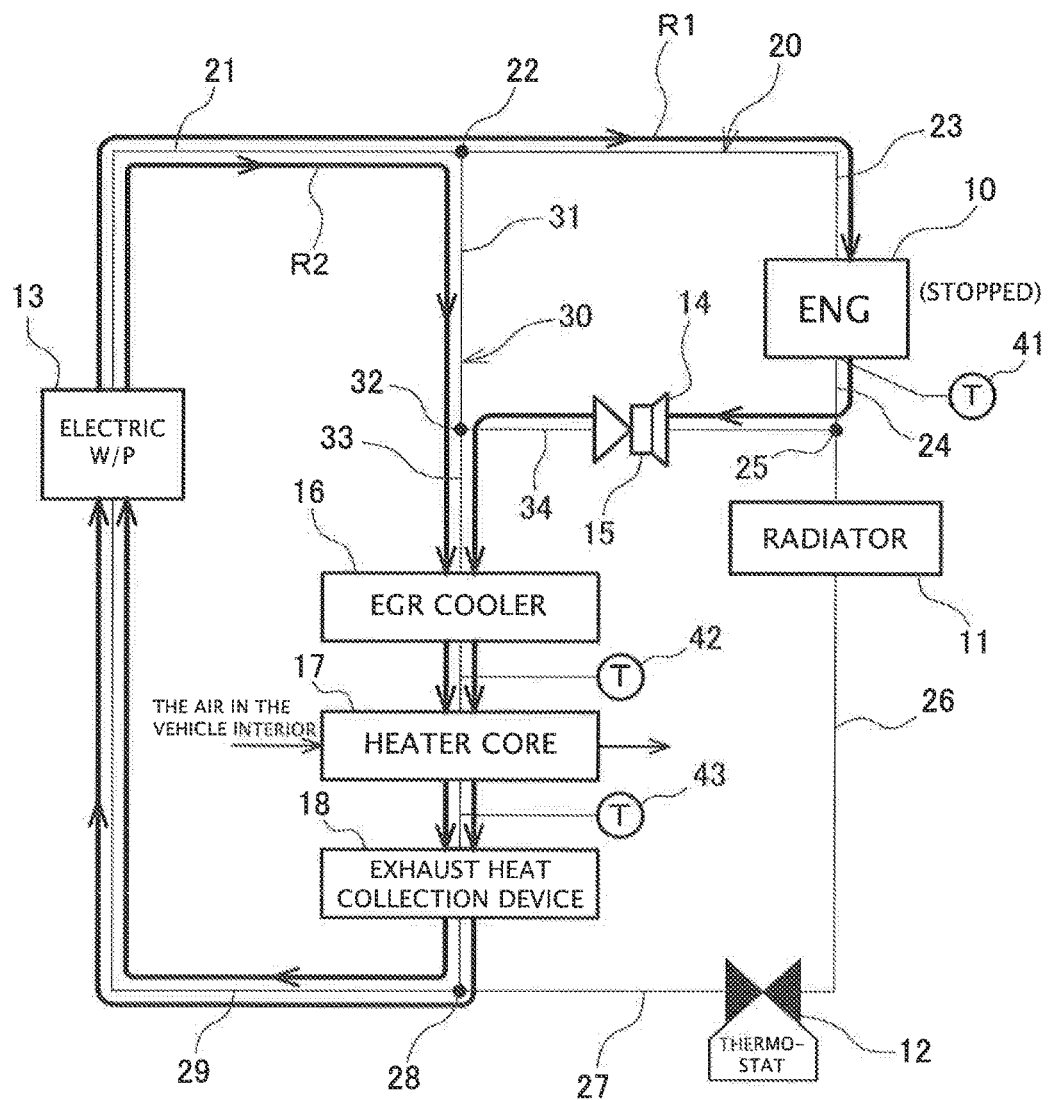
FIG. 9 is an explanatory view showing a flow of the coolant when coolant temperature drops to a predetermined temperature, after the engine intermittent stop, in the engine cooling system according to the embodiment of the present invention.

As shown in step S101 of FIG. 7, when the engine 10 is intermittently stopped, the temperature of the engine 10 and the temperature of the coolant are high just after the intermittent stop. Therefore, the EWP 13 continues to drive while the electromagnetic valve 14 is in the valve open state as shown in FIG. 8, until the temperatures of the engine 10 and the coolant drop to predetermined temperatures. Thus, the coolant flows as indicated by reference signs R1, R2, and R3 of FIG. 8, as in the case in which the engine 10 is in the normal operation. Since the engine 10 is stopped, the exhaust gas of the engine 10 does not flow to the EGR cooler 16 and the exhaust heat collection device 18. When the operation is performed for a while in the state shown in FIG. 8, the radiator 11 discharges the remaining heat of the engine 10, and the temperatures of the engine 10 and the coolant start to drop. When the temperature of the coolant flowing through the channel R3 shown in FIG. 8 drops to some extent, the thermostat 12 is closed as shown in FIG. 9. The coolant does not flow to the radiator 11, and the coolant flows as indicated by reference signs R1 and R2 of FIG. 9. Meanwhile, the control unit 50 acquires the coolant temperature of the engine outlet through the temperature sensor 41 and monitors whether the temperature drops to a predetermined temperature, such as about 60° C., as shown in step S102 of FIG. 7.

If the coolant temperature of the engine outlet drops to the predetermined temperature in step S102 of FIG. 1, the control unit 50 proceeds to step S103 of FIG. 7 and determines whether there is a valve closing request of the electromagnetic valve 14. The valve closing request command of the electromagnetic valve 14 is output from the ECU 55 to the control unit 50 when, for example, there is a request for maintaining the warm state when the engine 10 is stopped. When the control unit 50 receives the valve closing request command signal from the ECU 55, the control unit 50 determines YES in step S103 of FIG. 7 to proceed to step S104 of FIG. 7 and determines whether the heater in the vehicle interior is ON. The determination may be made by determining whether a signal of heater ON is output from the ECU. If the heater is ON in step S104 shown in FIG. 7, the control unit 50 determines that there is an actuation request of the heater core 17 for exchanging heat between the coolant and the air in the vehicle interior. The control unit 50 proceeds to step S105 of FIG. 7 and calculates a predicted change value of the temperature of the air blown out from the blower when the EWP 13 is temporarily stopped to close the electromagnetic valve 14. Although various methods can be used for the calculation, an example will be illustrated below.

Figure 12:
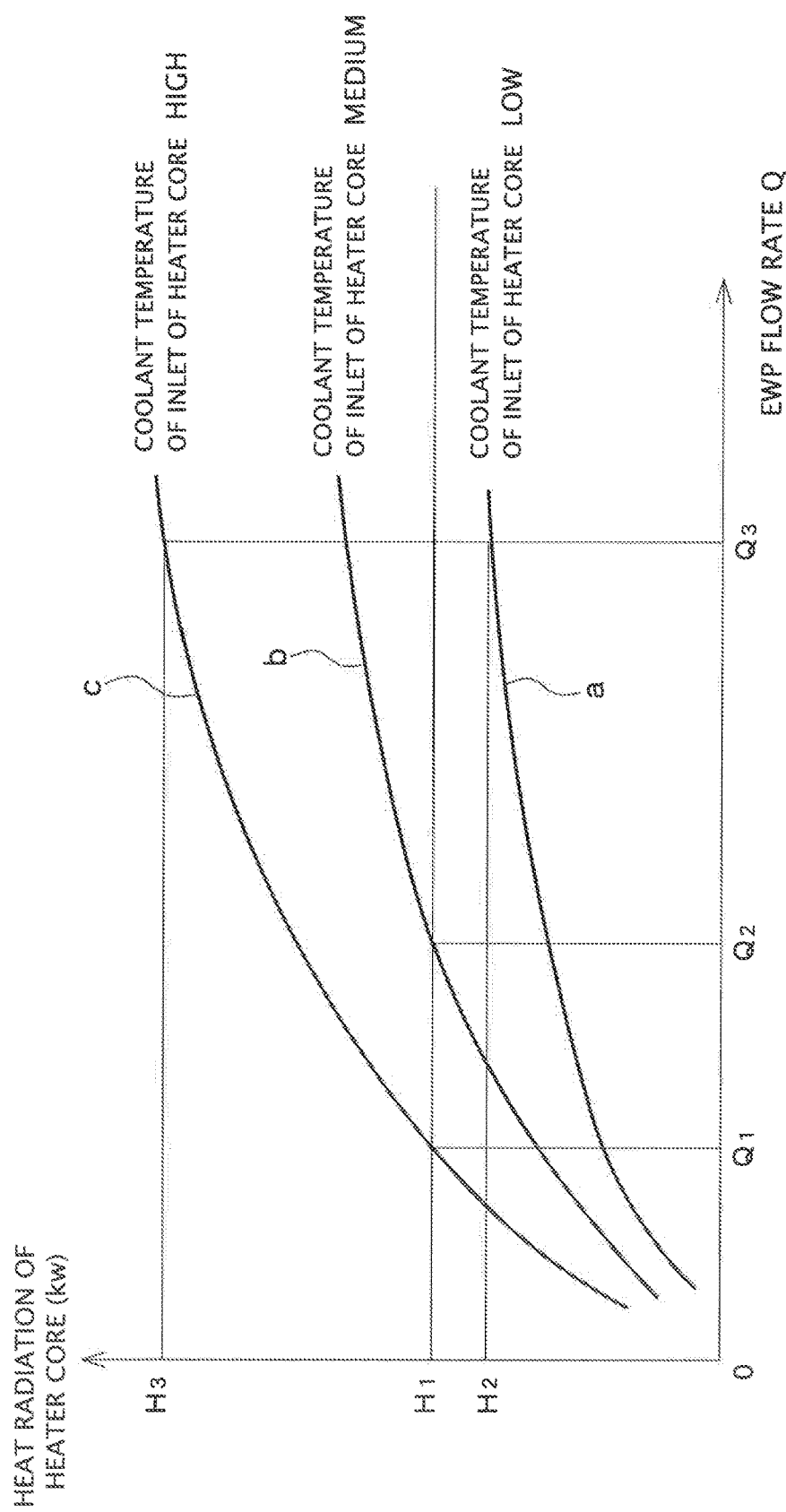
FIG. 12 is a graph showing a relationship between a flow rate of the electric water pump and a heat radiation of a heater core of the engine cooling system according to the embodiment of the present invention.

As shown in FIG. 12, the heat radiation of the heater core 17 increases with an increase in flow rate Q of the EWP 13. Therefore, the drop in the temperature of the air blown out from the blower for heating the vehicle interior when the EWP 13 is temporarily stopped increases with an increase in the flow rate Q of the EWP 13. Since the heat radiation of the heater core 17 increases with an increase in the inlet coolant temperature of the heater core 17, the drop in the temperature of the air blown out from the blower for heating the vehicle interior when the EWP 13 is temporarily stopped increases with an increase in the inlet coolant temperature of the heater core 17. For example, when the inlet coolant temperature of the heater core 17 is high and the flow rate of the EWP 13 is large at Q3, the heat radiation of the heater core 17 becomes large at H3 shown in FIG. 12. In this case, the heat radiation of the heater core 17 drops from H3 to substantially near zero when the EWP 13 is temporarily stopped, and the drop in the temperature of the air blown out from the blower becomes large. On the other hand, if the inlet coolant temperature of the heater core 17 is low, the heat radiation of the heater core 17 is small at H2 shown in FIG. 12 even when the flow rate of the EWP 13 is large at Q3. Therefore, although the heat radiation of the heater core 17 drops from H2 to substantially near zero when the EWP 13 is temporarily stopped, the drop in the temperature of the air blown out from the blower is relatively small. The flow rate Q of the EWP 13 can be calculated by a duty or a revolution command value of the motor that drives the EWP 13, output by the control unit 50.

Therefore, in step S105 of FIG. 7, the control unit 50 uses a map that can obtain the heat radiation of the heater core 17 from the flow rate Q of the EWP and the inlet coolant temperature of the heater core 17 shown in FIG. 12 to calculate the heat radiation of the heater core 17 from the flow rate Q of the EWP 13 calculated based on the duty or the revolution command value of the motor that drives the EWP 13 and from the inlet coolant temperature of the heater core 17 acquired by the temperature sensor 42 shown in FIG. 1. The control unit 50 calculates the predicted value of the drop in the temperature of the air blown out from the blower based on the heat radiation and the air flow of the blower and determines whether the predicted value is equal to or greater than a predetermined first threshold. The predetermined first threshold is a temperature change that feels uncomfortable to the driver, and may be, for example about 3° C. to 5° C. Instead, of calculating the temperature change, it may be determined that the change in the temperature of the air blown out from the blower exceeds the predetermined first threshold if the heat radiation of the heater core 17 is equal to or greater than a predetermined radiation H1 shown in FIG. 12, for example.

If the control unit 50 expects that the change in the temperature of the air blown out from the blower will be a temperature change equal to or greater than the predetermined first threshold so that the driver feels uncomfortable in step S105 of FIG. 7, the control unit 50 does not permit closing of the electromagnetic valve 14 even if the close command signal of the electromagnetic valve 14 is received from the ECU 55, and puts the electromagnetic valve 14 into a closing permission waiting state as shown in step S106 of FIG. 7.

Figure 10:
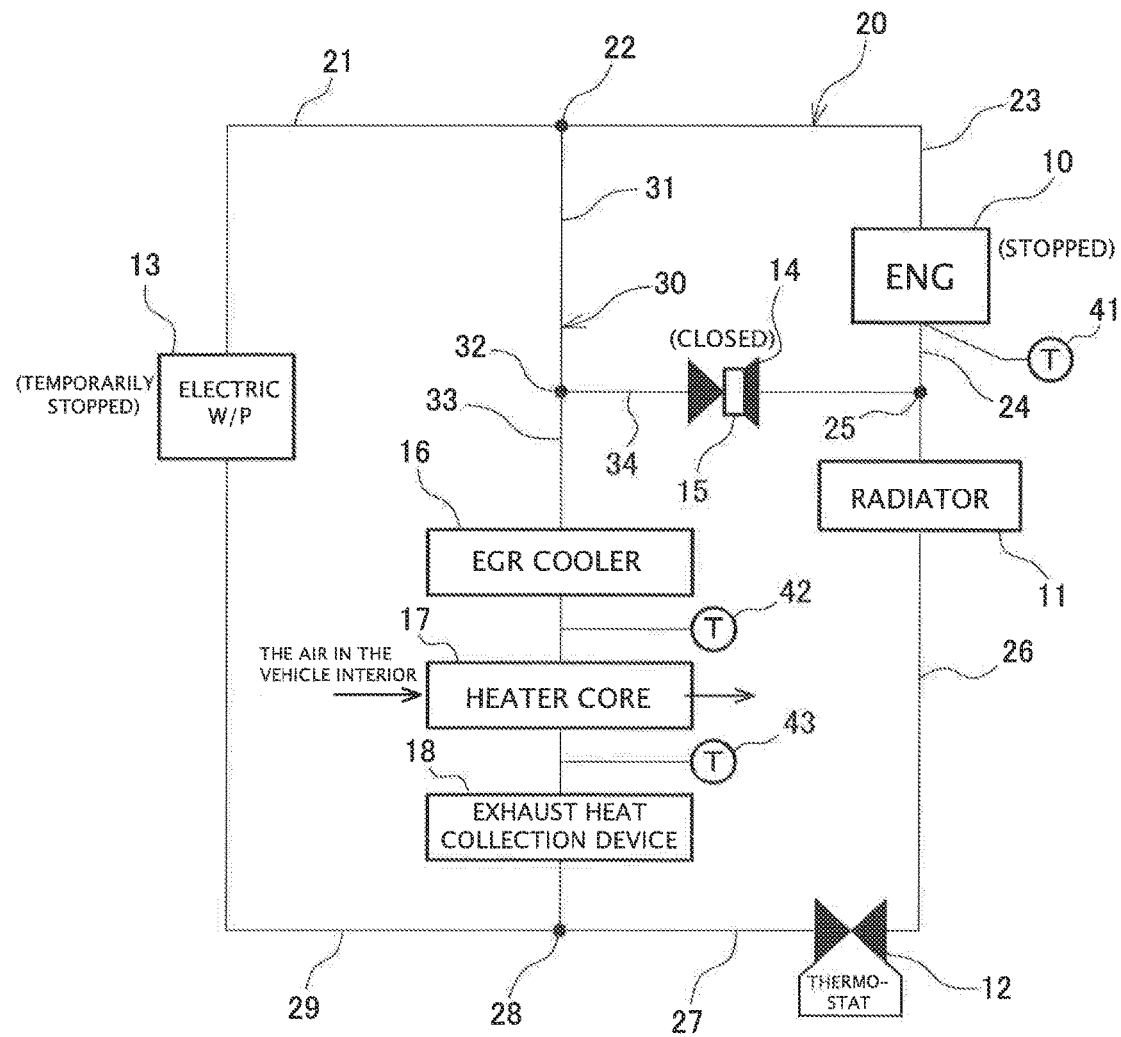
FIG. 10 is an explanatory view showing a flow of the coolant when the electromagnetic valve is closed by temporarily stopping the electric water pump (EWP) after the engine intermittent stop in the engine cooling system according to the embodiment of the present invention.
Figure 11:
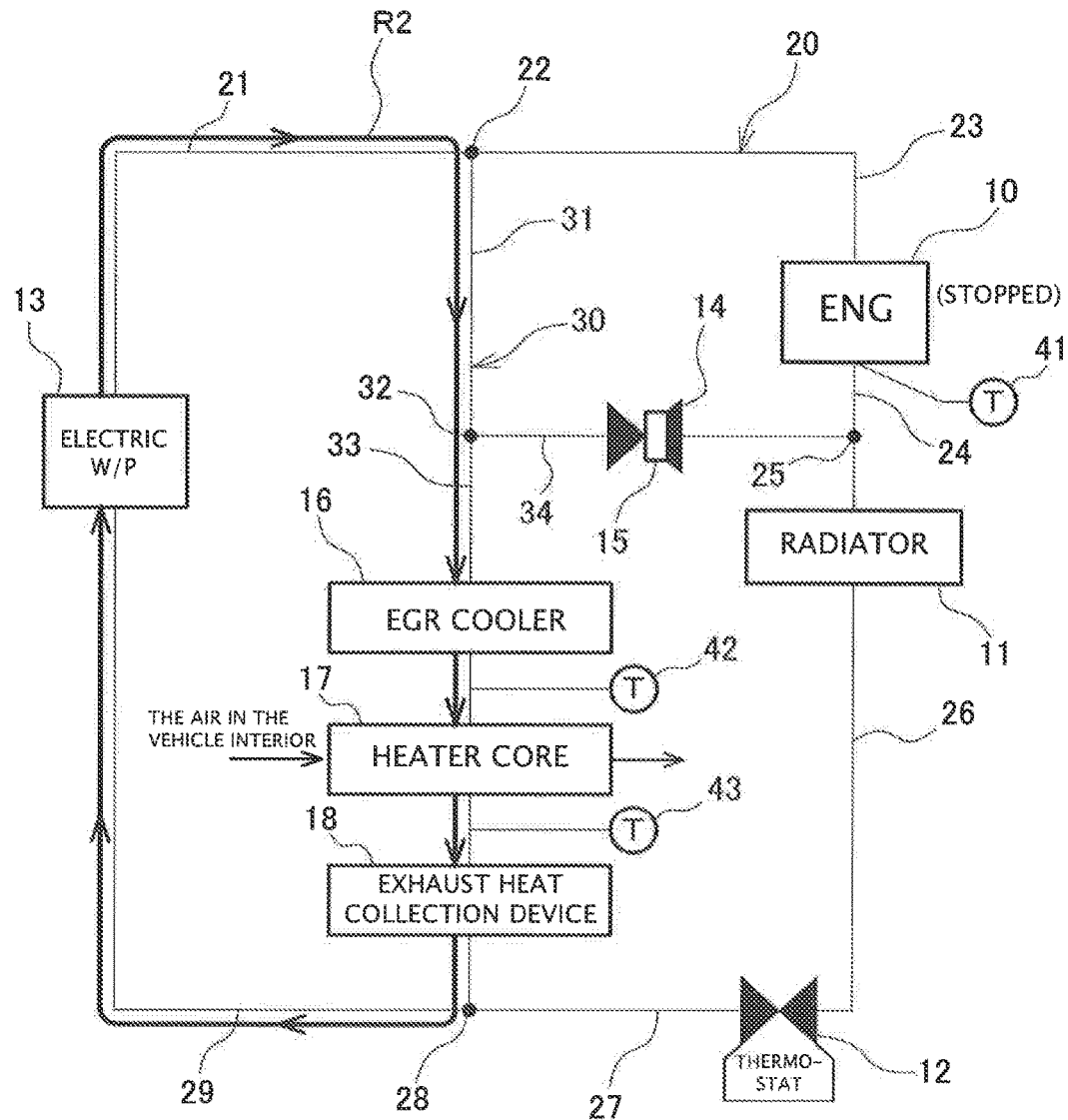
FIG. 11 is an explanatory view showing a flow of the coolant in the engine cooling system according to the embodiment of the present invention when the electric water pump (EWP) is restarted after the engine intermittent stop.

On the other hand, if the heater for heating the vehicle interior is not ON (heater OFF) in step S104 of FIG. 7, the control unit 50 determines that there is no actuation request of the heater core 17. The control unit 50 proceeds to step S107 of FIG. 7 and outputs a command for temporarily stopping the EWP 13. The EWP 13 is temporarily stopped by the command. The coolant pressure regarding the valve body 66 shown in FIG. 3 drops after a short time from the stop of the EWP 13, and the valve body 66 approaches the valve seat 65 due to the pressing force of the coil spring 67 and is seated on the valve seat 65 as shown in FIG. 2. The control unit 50 then outputs a command for applying a voltage to the electromagnetic coil 15 of the electromagnetic valve 14. The voltage is applied to the electromagnetic coil 15 as a result of the command, and the electromagnetic coil 15 sucks and fixes the valve body 66 to the valve seat 65. Consequently, the engine 10 and the EWP 13 are stopped, and the electromagnetic valve 14 enters the valve closed state as shown in FIG. 10. The control unit 50 then restarts the EWP 13 as shown in step S109 of FIG. 7. The EWP 13 is restarted by the command, and the coolant pressure is applied to the valve body 66 as shown in FIG. 2. However, the adsorption power of the electromagnetic coil 15 maintains the valve body 66 in the state seated on the valve seat 65, and the electromagnetic valve 14 maintains the valve closed state. Therefore, the coolant circulates through the second coolant circulation channel 30 as shown in FIG. 11 (indicated by reference sign R2 in FIG. 11). As a result, the coolant is not distributed to the engine 10 when the engine 10 is stopped, and the engine 10 is maintained in the warm state. The control unit 50 also proceeds to step S107 of FIG. 7 if it is determined that the predicted amount of change in the temperature of the air blown out from the blower when the EWP 13 is stopped is smaller than the predetermined first threshold in step S105 of FIG. 7 and if NO is determined in step S105 of FIG. 7. The control unit 50 temporarily stops the EWP 13 and then closes the electromagnetic valve 14 as shown in step S108 of FIG. 7. The control unit 50 then restarts the EWP 13 as shown in step S109 of FIG. 7.

In the description of the flow chart shown in FIG. 7, the process proceeds to step S105 if the heater is ON in step S104. However, if the heater is ON in step S104, step S105 may be skipped, and the process may proceed to step S106. The electromagnetic valve 14 may be put into the closing permission waiting state without permitting closing of the electromagnetic valve 14 even if the close command signal of the electromagnetic valve 14 is received from the ECU 55.

As described, the engine cooling system 100 of the present embodiment can prohibit closing of the electromagnetic valve 14 and continue the drive of the EWP 13 to prevent giving the driver a feeling of discomfort even if the closing command of the electromagnetic valve 14 is input to maintain the warm state of the engine 10 during the drive of the EWP 13 while the electromagnetic valve 14 is open after the engine intermittent stop. If it is determined that the driver does not feel uncomfortable even if the electromagnetic valve 14 is closed by temporarily stopping the EWP 13, the electromagnetic valve 14 may be closed by temporarily stopping the EWP 13 without prohibiting closing of the electromagnetic valve 14, and the warm state of the engine 10 can be maintained to improve the fuel efficiency.

The action in which the engine is intermittently stopped is described as an example of the action of the engine cooling system 100 when the electromagnetic valve is open, there is a valve closing request of the electromagnetic valve during the drive of the EWP, and there is an operation request of the heater core. However, the action is not limited to this. The engine cooling system 100 of the present embodiment can also perform the same action to prevent giving the driver a feeling of discomfort in the case of another operation action when the electromagnetic valve is open, there is a valve closing request of the electromagnetic valve during the drive of the EWP, and there is an operation request of the heater core.

<Example of Action of Engine Cooling System when Electromagnetic Valve is Open, there is Closing Request of Electromagnetic Valve during Drive of EWP, and there is Operation Request of Exhaust Heat Collection Device (Action when Engine Load Becomes High after Engine Cold Start and then Becomes Low before End of Engine Warmup)>

Action of the engine cooling system 100 will be described, wherein the voltage is not applied to the electromagnetic coil 15 of the electromagnetic, valve 14, the electromagnetic valve 14 is in the valve open state, there is a valve closing request of the electromagnetic valve 14 during the drive of the EWP 13, and there is an operation request of the exhaust heat collection device. This action is an action in which the engine load, becomes high after the engine cold start and then becomes low before the end of the engine warm-up. The action will be described, with reference to FIGS. 13 and 14.

Figure 13:
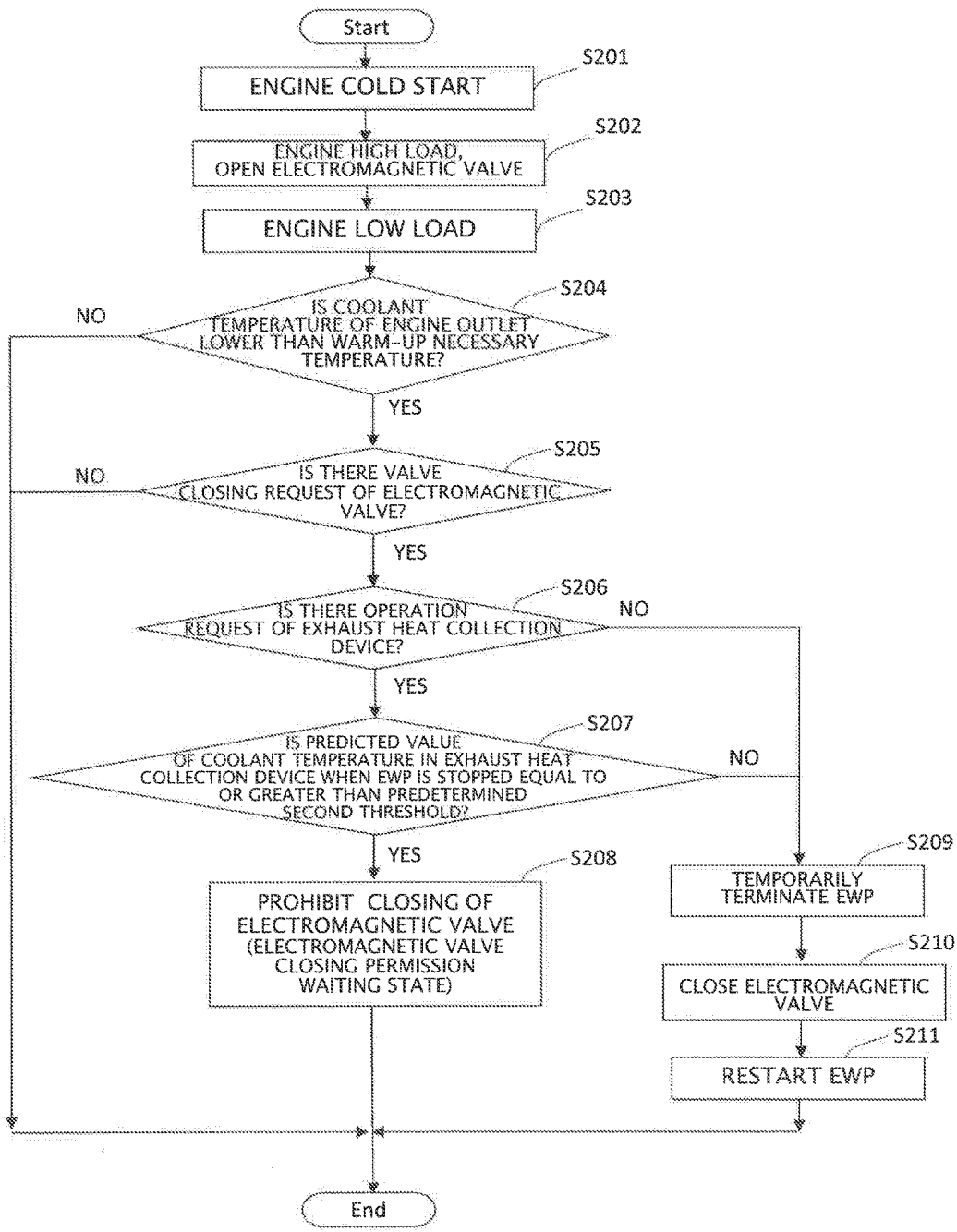
FIG. 13 is a flow chart showing opening and closing of the electromagnetic valve and action of the electric water pump (EWP) when the operation load changes from high to low in the engine cooling system according to the embodiment of the present invention just after the engine cold start.

As shown in step S201 of FIG. 13, when the control unit 50 receives a cold start signal of the engine 10 from the ECU 55, the control unit 50 applies a voltage to the electromagnetic coil 15 of the electromagnetic valve 14 to put the electromagnetic valve 14 into the valve closed state to start the EWP 13. Consequently, the coolant circulates through the second coolant circulation channel 30 as indicated by reference sign R2 in FIG. 4, and the coolant does not flow in the engine 10. In this state, as shown in step S202 of FIG. 13, when the control unit 50 receives a signal from the ECU 55 indicating that the load of the engine 10 is high, the control unit 50 cuts off the voltage of the electromagnetic coil 15 of the electromagnetic valve 14 to open the electromagnetic valve 14 to prevent boiling due to a local rapid rise in the coolant temperature in the engine 10. Consequently, the coolant flows in the engine 10 through the channels indicated by reference signs R1 and R2 in FIG. 5, and the local rapid rise in the coolant temperature in the engine 10 is prevented. As shown in step S203 of FIG. 13, when the control unit 50 receives a signal from the ECU 55 indicating that the load of the engine 10 has become low, the control unit 50 proceeds to step S204 of FIG. 13 and determines whether the coolant temperature of the engine outlet detected by the temperature sensor 41 is lower than a warm-up necessary temperature, or for example, whether the coolant temperature of the engine outlet is smaller than 60° C. If the control unit 50 determines that the coolant temperature of the engine outlet is lower than the warm-up necessary temperature (YES in step S204 of FIG, 13), the control unit 50 proceeds to step S205 of FIG. 13 and determines whether a valve closing request signal of the electromagnetic valve 14 is received from the ECU 55. If the control unit 50 receives the valve closing request signal of the electromagnetic valve 14 from the ECU 55, the control unit 50 proceeds to step S206 of FIG. 13 and determines whether the exhaust gas of the engine 10 passes through the exhaust heat collection device 18 to exchange heat (whether the exhaust heat is collected and there is an operation request of the exhaust heat collection device 18). If the exhaust heat collection device 18 collects the exhaust heat of the engine 10 in step S206 of FIG. 13, the control unit 50 determines that there is an operation request of the exhaust heat collection device 18 and proceeds to step S207 of FIG. 13. The control unit 50 predicts the coolant temperature in the exhaust heat collection device 18 when the EWP 13 is stopped and determines whether the coolant temperature is equal to or greater than a predetermined second threshold when the EWP 13 is temporarily stopped. Although there are various methods of predicting the coolant temperature in this case, an example of the methods will be described with reference to FIG. 14. Although the predetermined second threshold in the following description is a coolant boiling temperature TB at which the coolant boils, the predetermined second threshold is not limited to this.

Figure 14:
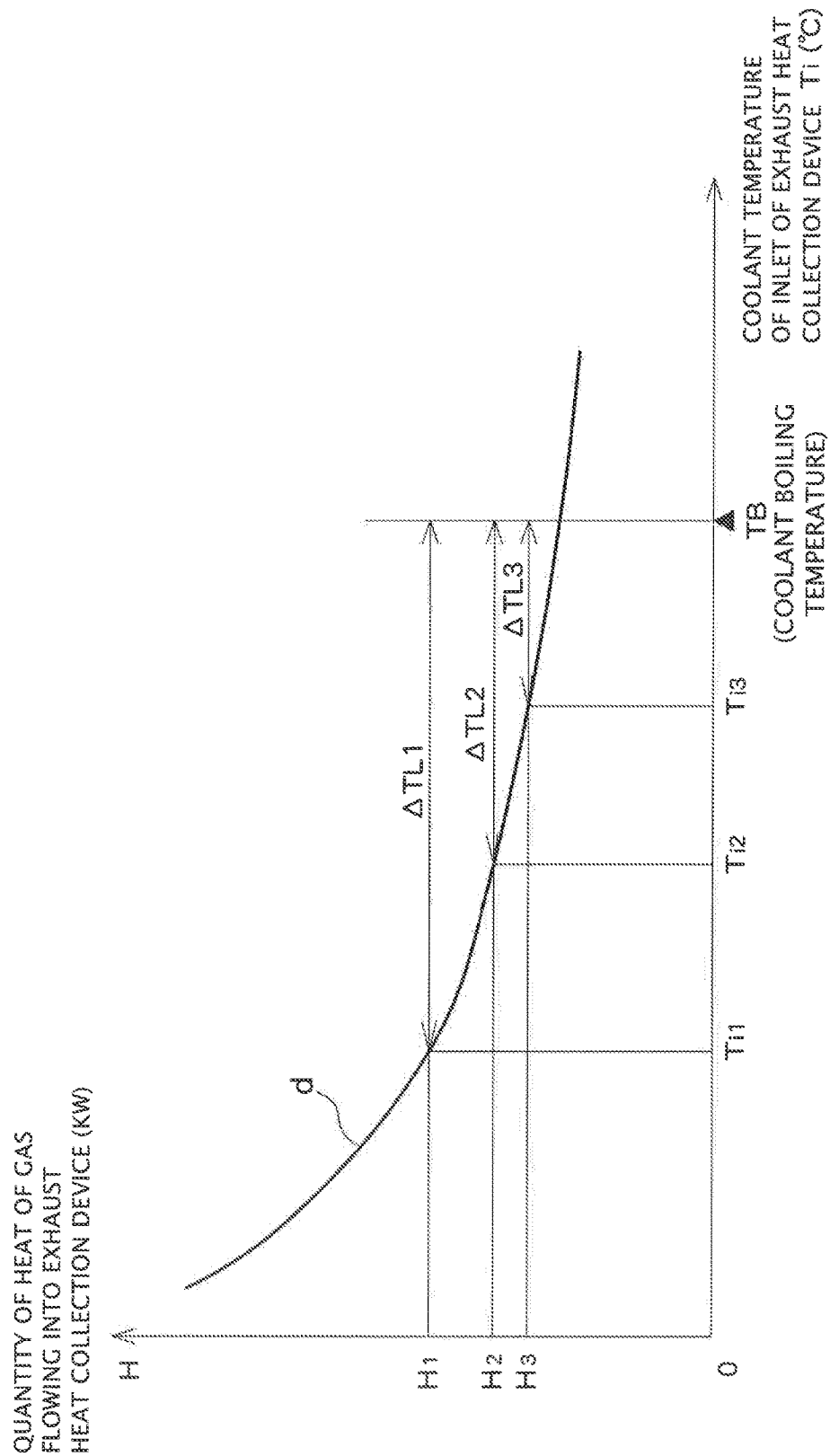
FIG. 14 is an electromagnetic valve closing permission limit curve determined by an inlet coolant temperature of an exhaust heat collection device and a quantity of heat of engine exhaust gas flowing into the exhaust heat collection device of the engine cooling system according to the embodiment of the present invention.

The quantity of heat of the engine exhaust gas flowing into the exhaust heat collection device 18 is determined by the flow rate and the temperature of the engine exhaust gas. As shown in FIG. 14, when a quantity of heat H of the engine exhaust gas flowing into the exhaust heat collection device 18 is large at H1, a temperature rise ΔTL of the coolant staying in the exhaust heat collection device 18 due to the stop of the EWP 13 is large at ΔTL1. When the quantity of heat H is small at H3, the temperature rise ΔTL of the coolant is small at ΔTL3. When the quantity of heat is medium at H2, the temperature rise of the coolant is ΔTL2 which is between ΔTL1 and ΔTL3. Meanwhile, the coolant boiling temperature TB at which the coolant staying in the exhaust heat collection device 18 boils is constant. Therefore, the temperature obtained by subtracting the temperature rise ΔTL1, ΔTL2, or ΔTL3 of the coolant based on the quantity of heat of the engine exhaust gas from the coolant boiling temperature TB indicates a limit temperature at which the temperature of the coolant staying in the exhaust heat collection device 18 reaches the coolant boiling temperature TB when the EWP 13 is temporarily stopped. A line d shown in FIG. 14 is a curve indicating the limit temperature.

Therefore, the control unit 50 stores the curve d of FIG. 14 in the storage unit and calculates the flow rate and the temperature of the engine exhaust gas from the rotational speed and the load of the engine to calculate the quantity of heat H of the engine exhaust gas flowing into the exhaust heat collection device 18. The temperature sensor 43 shown in FIG. 1 acquires a coolant temperature Ti of the inlet of the exhaust heat collection device 18, and if the relationship between the quantity of heat H and the coolant temperature Ti is positioned below the line d shown in FIG. 14, the control unit 50 determines that the temperature of the coolant staying in the exhaust heat collection device 18 does not rise to the coolant boiling temperature TB that is the predetermined second threshold, even when the EWP 13 is temporarily stopped. Therefore, the control unit 50 determines NO in step S207 of FIG. 13. On the other hand, if the relationship between the quantity of heat H and the coolant temperature Ti is positioned above the line a shown in FIG. 14, the control unit 50 determines that the temperature of the coolant staying in the exhaust heat collection device 18 rises and exceeds the coolant boiling temperature TB that is the predetermined second threshold, when the EWP 13 is temporarily stopped. Therefore, the control unit 50 determines YES in step S207 of FIG. 13.

If the control unit 50 determines YES in step S207 of FIG. 13, that is, if the control unit 50 determines that the temperature of the coolant staying in the exhaust heat collection device 18 becomes equal to or higher than the coolant boiling temperature TB that is the predetermined second threshold when the EWP 13 is temporarily stopped, the control unit 50 proceeds to step S208 of FIG. 13. The control unit 50 does not permit closing of the electromagnetic valve 14 even if the close command signal of the electromagnetic valve 14 is received from the ECU 55 and puts the electromagnetic valve 14 into the closing permission waiting state to continue the drive of the EWP 13.

On the other hand, if the control unit 50 determines NO in step S207 of FIG. 13, that is, if the control unit 50 determines that the temperature of the coolant staying in the exhaust heat collection device 18 does not become equal to or higher than the coolant boiling temperature TB that is the predetermined second threshold even when the EWP 13 is temporarily stopped, the control unit 50 proceeds to step S209 of FIG. 13 as in the action in the engine intermittent stop described with reference to FIG. 7. The control unit 50 temporarily stops the EWP 13 and then closes the electromagnetic valve 14 as shown in step S210 of FIG. 13. As a result, the coolant is not distributed to the engine 10, and the engine 10 can be held in the warm-up state. The control unit 50 then restarts the EWP 13 as shown in step S211 of FIG. 13.

If the exhaust heat of the exhaust gas of the engine is not collected and there is no operation request of the exhaust heat collection device 18 in step S206 of FIG. 13, the control unit 50 determines NO in step S206 of FIG. 13 and proceeds to step S209 of FIG. 13. The control unit 50 temporarily stops the EWP 13 and then closes the electromagnetic valve 14 as shown in step S210 of FIG. 13. Subsequently, the control unit 50 restarts the EWP 13 as shown in step S211 of FIG. 13.

Although the control unit 50 proceeds to step S207 if there is an operation request of the exhaust heat collection device 18 in step S206 in the description of the flow chart shown in FIG. 13, the control unit 50 may skip step S207 and proceed to step S208 if the control unit 50 determines that there is an operation request of the exhaust heat collection device 18 in step S206. The control unit 50 may not permit closing of the electromagnetic valve 14 even if the close command signal of the electromagnetic valve 14 is received from the ECU 55 and may put the electromagnetic valve 14 into the closing permission waiting state to continue the drive of the EWP 13.

As described, the engine cooling system 100 of the present embodiment can prevent boiling of the coolant in the exhaust heat collection device 18 caused by the temporary stop of the EWP 13 due to the closing of the electromagnetic valve 14 when the engine load becomes high after the engine cold start and then becomes low before the end of the engine warm-up. If it is determined that the coolant in the exhaust heat collection device 18 does not boil, the EWP 13 can be temporarily stopped to close the electromagnetic valve 14 to improve the fuel efficiency by maintaining the warm state of the engine 10.

In the embodiment, the action of the engine cooling system 100 when the load becomes high after the engine cold start and then becomes low before the end of the warm-up is described as an example of the case in which the voltage is not applied to the electromagnetic coil 15 of the electromagnetic valve 14, the electromagnetic valve 14 is in the valve open state, there is a valve closing request of the electromagnetic valve 14 during the drive of the EWP 13, and there is an operation request of the exhaust heat collection device. However, the engine cooling system 100 of the present embodiment can perform the same action in another operation situation in which the voltage is not applied to the electromagnetic coil 15 of the electromagnetic valve 14, the electromagnetic valve 14 is in the valve open state, there is a valve closing request of the electromagnetic valve 14 during the drive of the EWP 13, and there is an operation request of the exhaust heat collection device 18. The engine cooling system 100 can prevent boiling of the coolant in the exhaust heat collection device 18 and can improve the fuel efficiency by maintaining the warm state of the engine 10.

<Action of Engine System Cooling System when Electromagnetic Valve is Open, there is Closing Request of Electromagnetic Valve during Drive of EWP, and there is Operation Request of EGR>

Action of she engine cooling system 100 will be described, in which the voltage is not applied to the electromagnetic coil 15 of the electromagnetic valve 14, the electromagnetic valve 14 is in the valve open state, there is a valve closing request of the electromagnetic valve 14 during the drive of the EWP 13, and the EGR is in operation. When the coolant temperature of the engine outlet is a normal operation temperature and the engine load is medium or larger, exhaust gas recirculation operation of the engine 10 is performed (EGR ON). The EGR cooler 16 cools the engine exhaust gas when the EGR is ON, and the engine exhaust gas recirculates in the engine 10. Meanwhile, the engine exhaust gas heats the coolant as in the exhaust heat collection device 18, and the temperature of the coolant rises. When there is a valve closing request of the electromagnetic valve 14 in the EGR ON operation state, and the EWP 13 is stopped to close the electromagnetic valve 14, the temperature of the exhaust gas recirculating in the engine 10 becomes high, and knocking of the engine 10 may occur. In such a case, the engine cooling system 100 prohibits closing of the electromagnetic valve 14 to prevent the occurrence of knocking in the engine 10.

Figure 15:
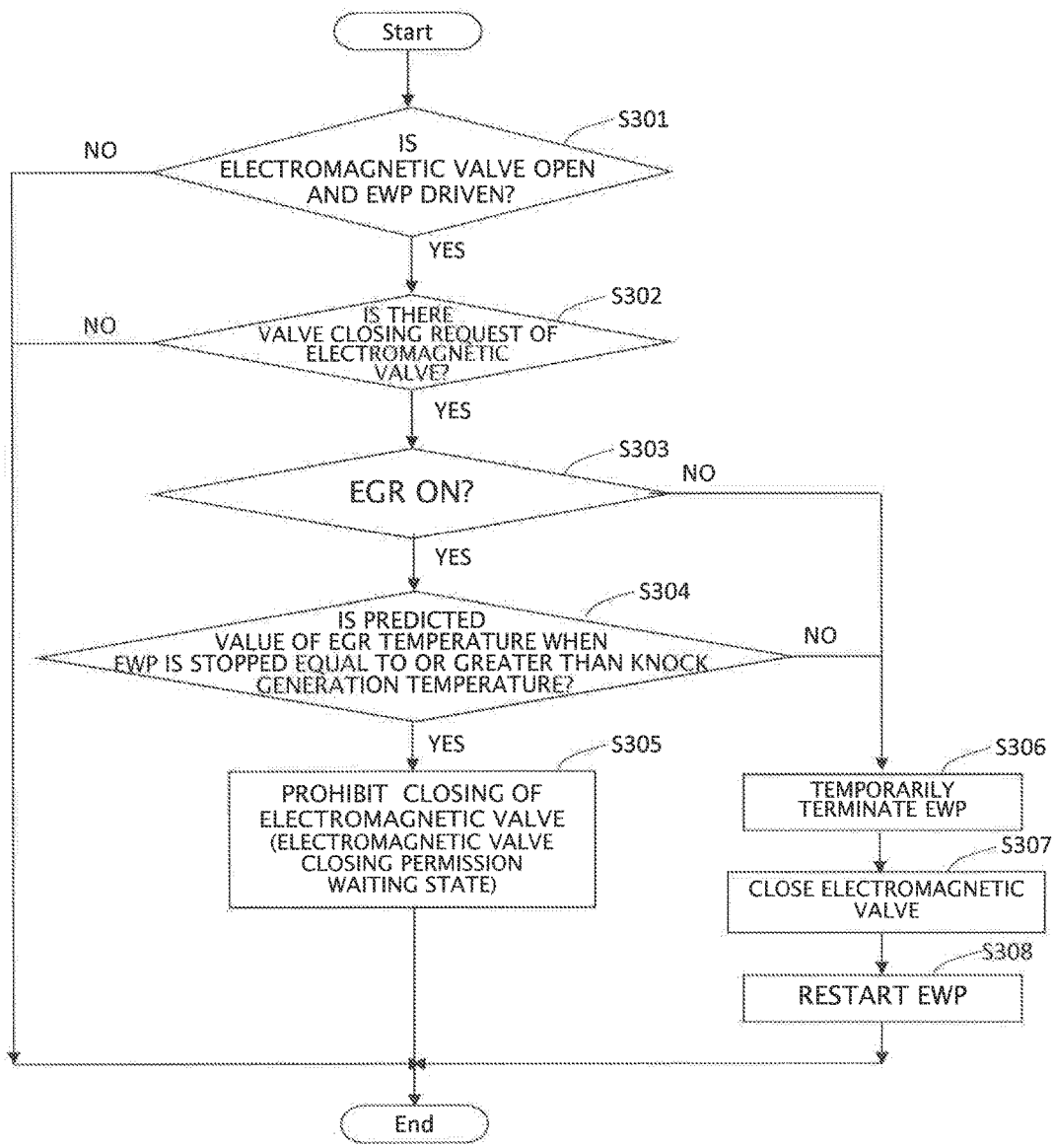
FIG. 15 is a flow chart showing action when closing of the electromagnetic valve is prohibited depending on an operation state of an EGR of the engine cooling system according to the embodiment of the present invention.

As shown in step S301 of FIG. 15, the control unit 50 proceeds to step S302 when the voltage is not applied to the electromagnetic coil 15 of the electromagnetic valve 14, the electromagnetic valve 14 is in the valve open state, and the EWP 13 is driven. The control unit 50 checks whether a valve closing request signal of the electromagnetic valve 14 is input from the ECU 55. If the control unit 50 determines that the closing signal of the electromagnetic valve 14 is input in step S302 of FIG. 15, the control unit 50 proceeds to step S303 of FIG. 15 and determines whether there is an operation request of the EGR and the EGR is in operation. The determination may be made based on, for example, whether a signal of EGR ON is input from the ECU 55. If the control unit 50 determines that the EGR is ON in step S303 of FIG. 15, the control unit 50 proceeds to step S304 of FIG. 15 and predicts the EGR gas temperature when the EWP 13 is stopped. The EGR gas temperature may be predicted and calculated based on a map with parameters, such as the engine load and the coolant temperature of the inlet of the EGR cooler 16. If the calculated predicted value of the EGR gas temperature is equal to or higher than the gas temperature at which knocking occurs in the engine 10, the control unit 50 prohibits closing of the electromagnetic valve 14 and the control unit 50 to continue the drive of the EWP 13 as shown in step S305 of FIG. 15, thereby preventing the EGR gas temperature from rising to the knocking generation temperature to prevent giving the driver a feeling of discomfort. On the other hand, if the EGR is not ON in step S303 of FIG. 15 or if it is determined that the EGR gas temperature does not rise to the knocking generation temperature even if the EWP 13 is temporarily stopped in step S304 of FIG. 15, the control unit proceeds to step S306 of FIG. 15 as in the action in the engine intermittent stop described with reference to FIG. 7. The control unit 50 temporarily stops the EWP 13 and then applies a voltage to the electromagnetic coil 15 of the electromagnetic valve 14 to close the electromagnetic valve 14. The control unit 50 then restarts the EWP 13 as shown in step S308 of FIG. 15.

The control unit 50 proceeds to step S304 if there is an operation request of the EGR in step S303 in the description of the flow chart shown in FIG. 15. However, the control unit 50 may skip step S304 and proceed to step S305 if the control unit 50 determines that there is an operation request of the EGR in step S303. The control unit 50 may not permit closing of the electromagnetic valve 14 even if the close command signal of the electromagnetic valve 14 is received from the ECU 55 and may put the electromagnetic valve 14 into the closing permission waiting state to continue the drive of the EWP 13.

As described, the engine cooling system 100 of the present embodiment can prevent the occurrence of knocking of the engine 10 after temporary stop of the EWP 13 due to closing of the electromagnetic valve 14, and can prevent giving the driver a feeling of discomfort when the voltage is not applied to the electromagnetic coil 15 of the electromagnetic valve 14, the electromagnetic valve 14 is in the valve open state, there is a valve closing request of the electromagnetic valve 14 during the drive of the EWP 13, and the EGR is in operation. If it is determined that the knocking of the engine 10 does not occur and the driver does not feel uncomfortable, the EWP 13 may be temporarily stopped to close the electromagnetic valve 14, and the warm state of the engine 10 may be maintained to improve the fuel efficiency.

Figure 16:
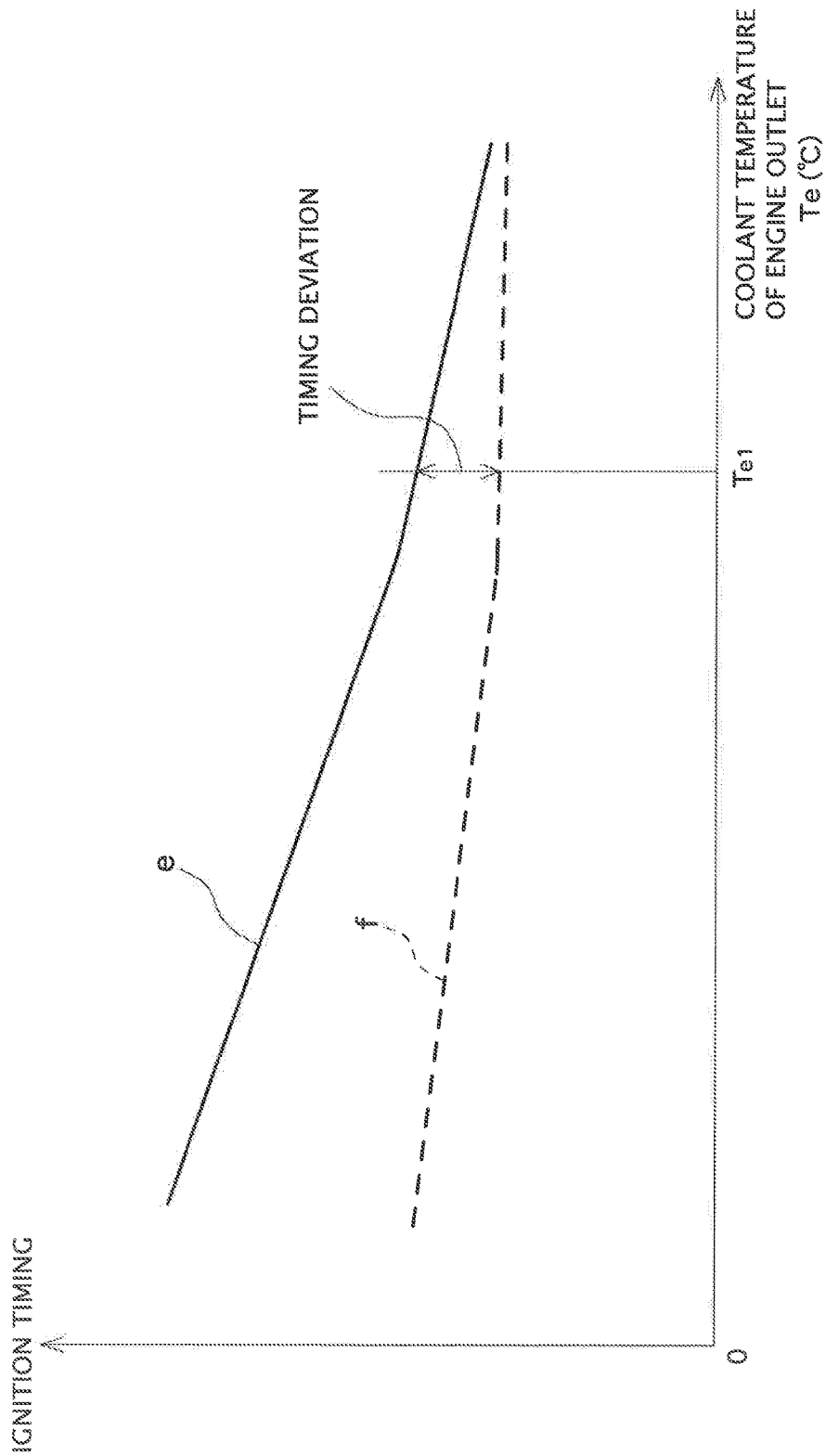
FIG. 16 is a graph showing a change in the coolant temperature of an engine outlet and ignition timing according to the embodiment of the present invention.

In the description above, the control unit 50 prohibits closing of the electromagnetic valve 14 to prevent the occurrence of knocking caused by a rise in the temperature of the EGR gas when the EWP 13 is temporarily stopped. However, the control unit 50 may prohibits closing of the electromagnetic valve 14 to prevent the occurrence of knocking due to a rise in the coolant temperature of the engine outlet when the EWP 13 is temporarily stopped. A timing deviation between an MET ignition timing (optimal ignition timing) and a TK ignition timing (trace knock ignition timing) decreases with an increase in the coolant temperature of the engine outlet. When the timing deviation becomes smaller than a predetermined threshold, there is no allowance for knocking, and the knocking may occur. Therefore, for example, the temperature sensor 41 detects the coolant temperature of the engine outlet, and the control unit 50 calculates the timing deviation between the MBT ignition timing (optimal ignition timing) and the TK ignition timing (trace knock ignition timing) based on a map of ignition timing relative to the coolant temperature of the engine outlet shown in FIG. 16. If the timing deviation is smaller than a predetermined threshold, the control unit 50 prohibits closing of the electromagnetic valve 14 by determining that there is no allowance for knocking. This can prevent the occurrence of knocking of the engine 10 caused by a rise in the coolant temperature of the engine outlet after the temporary stop of the EWP 13 and can prevent giving the driver a feeling of discomfort.

As described, the engine cooling system 100 of the present embodiment has advantages of preventing the driver from, feeling uncomfortable and preventing boiling of the coolant in the exhaust heat collection device 18 by prohibiting closing of the electromagnetic valve 14 to continue the operation of the EWP 13 when the voltage is not applied to the electromagnetic coil 15 of the electromagnetic valve 14, the electromagnetic valve 14 is in the valve open state, and there is a valve closing request of the electromagnetic valve 14 during the drive of the EWP 13. The engine cooling system 100 of the present embodiment can also improve the fuel efficiency by temporarily stopping the EWP 13 to close the electromagnetic valve 14 to maintain the warm state of the engine 10 if it is expected that the driver does not feel uncomfortable and the coolant in the exhaust heat collection device 18 does not boil.

REFERENCE SIGNS LIST 10 engine, 11 radiator, 12 thermostat, 13 electric water pump (EWP), 14 electromagnetic valve, 15 electromagnetic coil, 16 EGR cooler, 17 heater core, 18 exhaust heat collection device, 20 first coolant circulation channel, 21 pump outlet pipe, 22, 25 branch points, 23 engine inlet pipe, 24 engine outlet pipe, 26 radiator outlet pipe, 27 thermostat outlet pipe, 28, 32 junctions, 29 pump inlet pipe, 30 second coolant circulation channel, 31 engine bypass pipe, 33 radiator bypass pipe, 34 connection channel, 41 to 43 temperature sensors, 50 control unit, 55 ECU, 61 casing, 62 coolant inlet, 63 coolant outlet, 64 cavity, 65 valve seat, 66 valve body, 67 coil spring, 100 engine cooling system

The invention claimed is:

1. An engine cooling system comprising:
   a first coolant circulation channel passing through an engine;
   a second coolant circulation channel bypassing the engine;
   a coolant pump that circulates a coolant in the first and second coolant circulation channels;
   a connection channel connecting an engine outlet pipe of the first coolant circulation channel and the second coolant circulation channel;
   an electromagnetic valve arranged in the connection channel to change a flow rate of the coolant passing through the engine and flowing from the first coolant circulation channel to the second coolant circulation channel;
   a heat exchanger arranged in the second coolant circulation channel; and
   a control unit that starts and stops the coolant pump and that opens and closes the electromagnetic valve, wherein the control unit prohibits closing of the electromagnetic valve if there is an actuation request of the heat exchanger when there is a valve closing request of the electromagnetic valve after the electromagnetic valve is opened.

2. The engine cooling system according to claim 1, wherein the control unit prohibits closing of the electromagnetic valve if a temperature or a temperature change of a fluid for heat exchange with the coolant by the heat exchanger when the coolant pump is stopped is expected to be equal to or greater than a predetermined first threshold, or if a coolant temperature in the heat exchanger is expected to be equal to or higher than a predetermined second threshold, when there is a valve closing request of the electromagnetic valve.

3. The engine cooling system according to claim 2, wherein the control unit closes the electromagnetic valve after stopping the coolant pump if the temperature or the temperature change of the fluid for heat exchange with the coolant by the heat exchanger when the coolant pump is stopped is expected to be smaller than the predetermined first threshold or if the coolant temperature in the heat exchanger is expected to be lower than the predetermined second threshold, when there is a valve closing request of the electromagnetic valve.

4. The engine cooling system according to claim 1, wherein the control unit closes the electromagnetic valve after stopping the coolant pump if there is no actuation request of the heat exchanger when there is a valve closing request of the electromagnetic valve.

5. The engine cooling system according to claim 1, wherein the electromagnetic valve is a valve that holds a valve closed state when a voltage is applied while the coolant pump is stopped and that opens when the voltage is cut off during drive of the coolant pump.

6. The engine cooling system according to claim 5, wherein the electromagnetic valve comprises:
   a casing provided with a valve seat on which a valve body is seated;
   an electromagnetic coil attached in the casing closer to a coolant inlet of the valve seat; and
   a spring for pressing the valve body toward the valve seat, wherein pressing force of the spring is smaller than force that is generated by the drive of the coolant pump and that is applied to the valve body in a direction from the coolant inlet to a coolant outlet, the valve body is sucked toward the coolant inlet and seated on the valve seat to maintain the valve closed state if a voltage is applied to the electromagnetic coil when the coolant pump is stopped, and the valve body is separated from the valve seat to open the valve due to coolant pressure from the coolant inlet if the voltage of the electromagnetic coil is cut off during the drive of the coolant pump.

7. The engine cooling system according to claim 1, wherein the heat exchanger is arranged in the second coolant circulation channel, downstream of a connection point of the second coolant circulation channel and the connection channel.

8. An operation method of an engine cooling system, the engine cooling system comprising:
- a first coolant circulation channel passing through an engine;
- a second coolant circulation channel bypassing the engine;
- a coolant pump that circulates a coolant in the first and second coolant circulation channels;
- a connection channel connecting an engine outlet of the first coolant circulation channel and the second coolant circulation channel;
- an electromagnetic valve arranged in the connection channel to change a flow rate of the coolant passing through the engine and flowing from the first coolant circulation channel to the second coolant circulation channel; and
- a heat exchanger arranged in the second coolant circulation channel, wherein closing of the electromagnetic valve is prohibited if there is an actuation request of the heat exchanger when there is a valve closing request of the electromagnetic valve after the electromagnetic valve is opened.

9. The operation method according to claim 8, wherein closing of the electromagnetic valve is prohibited if a temperature or a temperature change of a fluid for heat exchange with the coolant by the heat exchanger when the coolant pump is stopped is expected to be equal to or greater than a predetermined first threshold, or if a coolant temperature in the heat exchanger is expected to be equal to or higher than a predetermined second threshold, when there is a valve closing request of the electromagnetic valve.

10. The operation method according to claim 9, wherein the electromagnetic valve is closed after stopping the coolant pump if the temperature or the temperature change of the fluid for heat exchange with the coolant by the heat exchanger when the coolant pump is stopped is expected to be smaller than the predetermined first threshold, or if the coolant temperature in the heat exchanger is expected to be lower than the predetermined second threshold, when there is a valve closing request of the electromagnetic valve.

11. The operation method according to claim 8, wherein the electromagnetic valve is closed after stopping the coolant pump if there is no actuation request of the heat exchanger when there is a valve closing request of the electromagnetic valve.

* * * * *